United States Patent
Sekine

(10) Patent No.: US 9,544,559 B2
(45) Date of Patent: Jan. 10, 2017

(54) DEVICE AND METHOD FOR PROCESSING IMAGES

(71) Applicant: SOCIONEXT INC., Yokohama-shi, Kanagawa (JP)

(72) Inventor: Nobuaki Sekine, Kasugai (JP)

(73) Assignee: SOCIONEXT INC., Yokohama (JP)

( * ) Notice: Subject to any disclaimer, the term of this patent is extended or adjusted under 35 U.S.C. 154(b) by 71 days.

(21) Appl. No.: 14/697,111

(22) Filed: Apr. 27, 2015

(65) Prior Publication Data

US 2015/0326808 A1    Nov. 12, 2015

(30) Foreign Application Priority Data

May 8, 2014    (JP) ................................. 2014-096907

(51) Int. Cl.

| | | |
|---|---|---|
| *H04N 9/64* | (2006.01) | |
| *H04N 5/378* | (2011.01) | |
| *H04N 5/369* | (2011.01) | |
| *H04N 5/376* | (2011.01) | |
| *H04N 9/04* | (2006.01) | |

(52) U.S. Cl.
CPC ................ *H04N 9/64* (2013.01); *H04N 5/369* (2013.01); *H04N 5/376* (2013.01); *H04N 5/378* (2013.01); *H04N 9/045* (2013.01)

(58) Field of Classification Search
None
See application file for complete search history.

(56) References Cited

U.S. PATENT DOCUMENTS

| | | | | |
|---|---|---|---|---|
| 5,999,206 | A | * 12/1999 | Inoue | ..................... H04N 1/407 347/183 |
| 7,692,833 | B2 | 4/2010 | Ito | |
| 7,969,629 | B2 | 6/2011 | Ito | |
| 8,203,770 | B2 | 6/2012 | Ito | |
| 8,514,471 | B2 | 8/2013 | Ito | |
| 2006/0072023 | A1* | 4/2006 | Kurosawa | ............ G09G 3/3607 348/294 |
| 2007/0248263 | A1* | 10/2007 | Matsutani | ............ H04N 1/3877 382/163 |
| 2007/0286529 | A1 | 12/2007 | Watarai | |

(Continued)

FOREIGN PATENT DOCUMENTS

| | | |
|---|---|---|
| JP | 6-70165 A | 3/1994 |
| JP | 2006-157252 A | 6/2006 |

(Continued)

*Primary Examiner* — Roberto Velez
*Assistant Examiner* — Cynthia Segura
(74) *Attorney, Agent, or Firm* — Arent Fox LLP

(57) ABSTRACT

An image processing device includes a first rearrangement circuit that receives, in parallel, pieces of line data included in image data. The first rearrangement circuit rearranges A-bit pixel data (where A is an integer that is greater than or equal to two) in the line data to arrange pixel data for only one color component in at least one of the line data. LUT correction circuits, arranged in correspondence with the line data, each include a memory that stores a lookup table and correct the rearranged A-bit pixel data using the corresponding lookup table. A second rearrangement circuit rearranges the corrected A-bit pixel data to return the A-bit pixel data rearranged by the first rearrangement circuit to an original arrangement order.

9 Claims, 16 Drawing Sheets

(56) References Cited

U.S. PATENT DOCUMENTS

| | | | |
|---|---|---|---|
| 2008/0170051 A1* | 7/2008 | Zhan | G09G 5/366 |
| | | | 345/204 |
| 2008/0189511 A1 | 8/2008 | Watarai et al. | |
| 2012/0120044 A1* | 5/2012 | Mizunaga | G09G 3/3614 |
| | | | 345/211 |
| 2012/0268619 A1* | 10/2012 | Uchida | H04N 5/365 |
| | | | 348/222.1 |
| 2013/0202202 A1 | 8/2013 | Hasu et al. | |
| 2014/0218567 A1* | 8/2014 | Han | H04N 5/2353 |
| | | | 348/239 |
| 2016/0233234 A1* | 8/2016 | Yang | H01L 27/124 |
| 2016/0234488 A1* | 8/2016 | Zhao | H04N 13/0402 |

FOREIGN PATENT DOCUMENTS

| | | |
|---|---|---|
| JP | 2007-293827 A | 11/2007 |
| JP | 2013-179584 A | 9/2013 |

* cited by examiner

| | SB | | | | | | | SA |
|---|---|---|---|---|---|---|---|---|
| | R11 | G12 | R13 | G14 | R15 | G16 | R17 | G18 | ~L1
| | G21 | B22 | G23 | B24 | G25 | B26 | G27 | B28 | ~L2
| SB | R31 | G32 | R33 | G34 | R35 | G36 | R37 | G38 | ~L3
| | G41 | B42 | G43 | B44 | G45 | B46 | G47 | B48 | ~L4
| | R51 | G52 | R53 | G54 | R55 | G56 | R57 | G58 | ~L5
| | G61 | B62 | G63 | B64 | G65 | B66 | G67 | B68 | ~L6
| | R71 | G72 | R73 | G74 | R75 | G76 | R77 | G78 | ~L7
| | G81 | B82 | G83 | B84 | G85 | B86 | G87 | B88 | ~L8

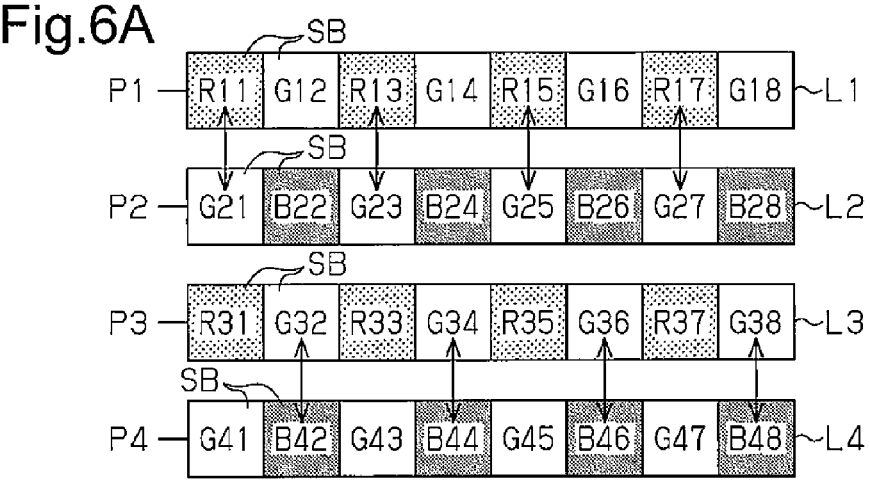
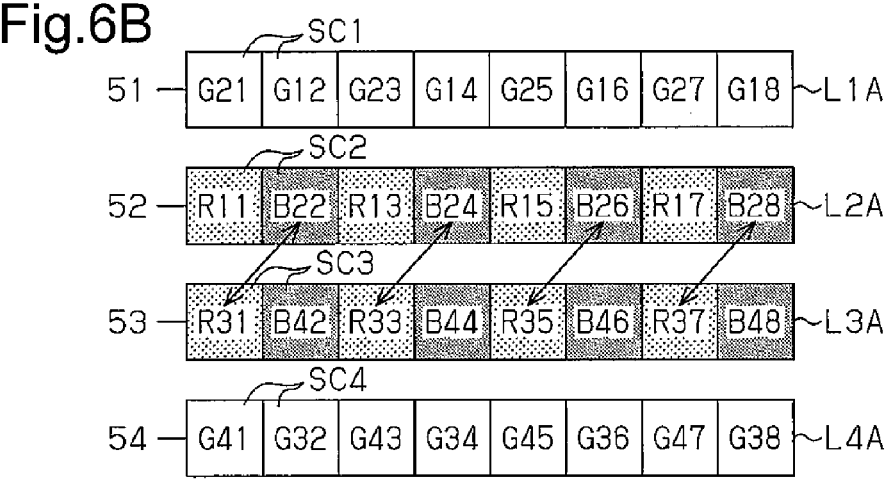
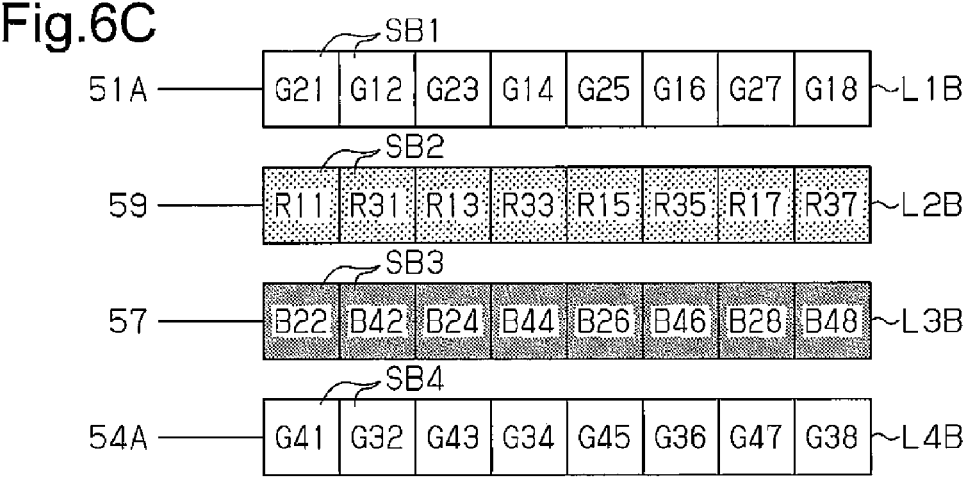

Knee Correction Curve

Deknee Correction Curve

DEVICE AND METHOD FOR PROCESSING IMAGES

CROSS-REFERENCE TO RELATED APPLICATIONS

This application is based upon and claims the benefit of priority from prior Japanese Patent Application No. 2014-096907, filed on May 8, 2014, the entire contents of which are incorporated herein by reference.

FIELD

The present disclosure relates to a device and a method for processing images.

BACKGROUND

The present disclosure relates to a device and method for processing images.

Electronic devices such as digital still cameras are capable of recording digital data of captured images. Such an electronic device includes an image processing device that converts the digital data of the captured image into a certain format. The image processing device performs image processing such as a sensor linearity correction. The sensor linearity correction is performed by executing, for example, a correction process (LUT correction process) that uses a lookup table (LUT). The LUT is a table illustrating output values (corrected data) corresponding to values input at specific intervals. The use of the LUT allows for non-linear properties, which are difficult to express with a mathematic expression, to be expressed. In the LUT correction process, for example, the input value is input as an address value of a RAM, which stores the LUT, and the output value corresponding to the address value is output as the corrected data to execute LUT correction (sensor linearity correction) on the input value.

FIG. 20 illustrates one example of an LUT correction unit 200 that performs the sensor linearity correction on image data of a Bayer arrangement output from an image sensor such as a CCD or a CMOS.

Due to the increase in the processing speed of image sensors, the LUT correction unit 200 is provided in parallel with plural pieces of pixel data SB each included in line data for a plurality of lines (four lines in the illustrated example) of the image data. The LUT correction unit 200 includes LUT sections 202A to 202D respectively for the lines to perform the sensor linearity correction (LUT correction process) on the pixel data SB for each line and output corrected pixel data SG. The LUT sections 202A to 202D each include a RAM storing a correction curve for the sensor linearity correction. The correction curve indicates the properties of the output value (sensor-linearity corrected pixel value) corresponding to the input value, and a dedicated correction curve is prepared for each color component. In other words, as illustrated in FIG. 21, a correction curve for red (R) component pixel data (R pixel), a correction curve for green (G) component pixel data (G pixel), and a correction curve for blue (B) component pixel data (B pixel) are prepared. In the image data of the Bayer arrangement, for example, R pixels and G pixels are alternately arranged in the line data of the first line and the third line, and G pixels and B pixels are alternately arranged in the line data of the second line and the fourth line. Thus, the LUT sections 202A and 202C, to which the line data of the first line and the third line are provided, respectively include RAMs 205A and 205C, which store the correction curve for the R pixels, and RAMs 206A and 206C, which store the correction curve for the G pixels. The LUT sections 202B and 202D, to which the line data of the second line and the fourth line are provided, respectively include RAMs 205B and 205D, which store the correction curve for the B pixels, and RAMs 206B and 206D, which store the correction curve for the G pixels.

In each of the LUT sections 202A to 202D, for example, the pixel data SB is provided as the address value of the RAMs 205A to 205D and 206A to 206D, and the output value corresponding to the address value is output to a selection circuit 207. In the LUT sections 202A to 202D, the selection circuit 207 selects the output values of the RAM 205A to 205D or the output values of the RAM 206A to 206D, and the selected output value is output as the sensor-linearity-corrected pixel data SG.

Literature related to the above-described related art include Japanese Laid-Open Patent Publication No. 6-70165 and Japanese Laid-Open Patent Publication No. 2007-293827.

SUMMARY

In the LUT correction unit 200, however, two or more RAMs need to be arranged in each of the LUT section 202A to 202D. Thus, when the number of lines provided in parallel to the LUT correction unit 200 increases due to higher image sensor speeds, this result in an increase in the total capacity of a memory in the LUT correction unit 200.

One aspect of the present disclosure is an image processing device including a first rearrangement circuit, LUT correction circuits, a second rearrangement circuit, and a cache memory. The first rearrangement circuit receives, in parallel, plural pieces of line data included in image data. The first rearrangement circuit rearranges plural pieces of A-bit pixel data (where A is an integer that is greater than or equal to two) included in the plural pieces of line data to arrange pixel data for only one color component in at least one of the plural pieces of line data. The LUT correction circuits are respectively arranged in correspondence with the plural pieces of line data. Each of the LUT correction circuits includes a memory that stores a lookup table, and each of the LUT correction circuits corrects the rearranged plural pieces of A-bit pixel data using the corresponding lookup table. The second rearrangement circuit rearranges the corrected plural pieces of A-bit pixel data to return the plural pieces of A-bit pixel data rearranged by the first rearrangement circuit to an original arrangement order. Each of the LUT correction circuits includes an LUT section that receives the corresponding one of the plural pieces of line data rearranged by the first rearrangement circuit and outputs output values from the memory using data of B upper order bits (where B is an integer that is smaller than A) of the A-bit pixel data in the received line data as an address value. The cache memory includes flip-flop circuits, each holding one of the output values. The cache memory outputs the output value held in one of the flip-flop circuits based on data of (A-B) lower order bits of the A-bit pixel data that have been rearranged by the first rearrangement circuit.

BRIEF DESCRIPTION OF THE DRAWINGS

The disclosure, together with objects and advantages thereof, may best be understood by reference to the following description of the presently preferred embodiments together with the accompanying drawings in which:

FIGS. 6A to 6C are explanatory diagrams illustrating the operation of the rearrangement circuit in the first embodiment;

DESCRIPTION OF THE EMBODIMENTS

First Embodiment

A first embodiment will now be described with reference to FIGS. 1 to 12.

Figure 1:
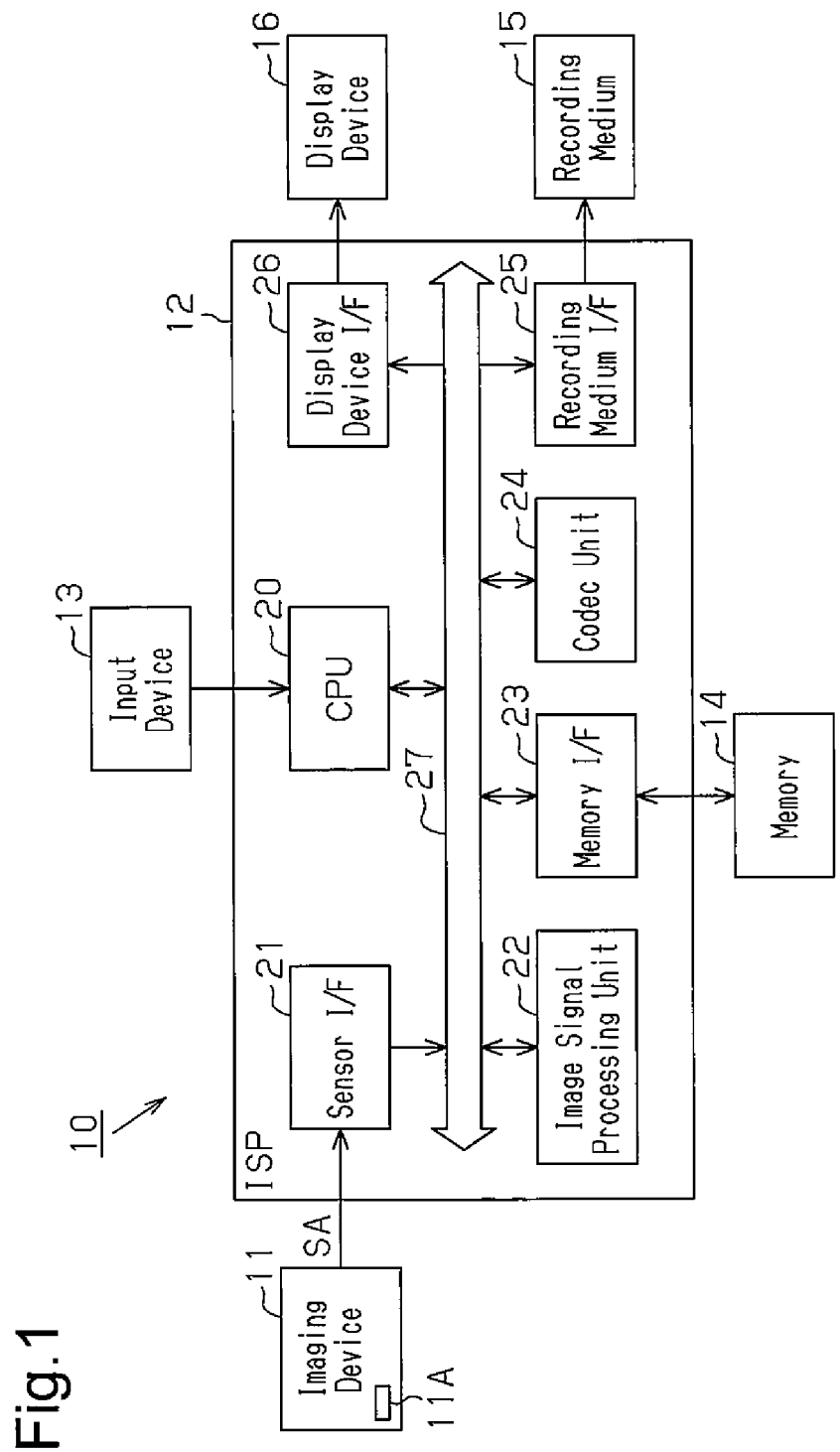
FIG. 1 is a block diagram illustrating an electronic device of a first embodiment.

An electronic device 10 illustrated in FIG. 1 is, for example, a digital still camera. The electronic device 10 includes an imaging device 11, an image processor 12 (ISP: Image Signal Processor), an input device 13, a memory 14, a recording medium 15, and a display device 16.

The imaging device 11 includes a Bayer arrangement color filter and an imaging element 11A. For example, a CCD (Charge Coupled Device) image sensor and a CMOS (Complementary MOS) image sensor may be used as the imaging element 11A. The imaging element 11A outputs a captured signal (analog signal) corresponding to an amount of light that enters through a color filter. The imaging device 11 converts the analog captured signal output from the imaging element 11A to digital captured data SA. The imaging device 11 outputs the converted captured data SA in response to a synchronization signal. The captured data SA output from the imaging device 11 is image data (frame image of one frame) for one screen captured by the imaging element 11A. The synchronization signal is a signal including a vertical synchronization signal indicating the end of one field (frame), and a horizontal synchronization signal indicating the end of each line, and for example, is a signal provided from an image processor 12.

The image processor 12, for example, performs various types of image processing on the captured data SA (e.g., image data (Bayer data) in RGB format) output from the imaging device 11 based on an input signal from the input device 13. The image processor 12 temporarily stores the image data in the memory 14 at a predetermined processing stage. In other words, the memory 14 functions as a work memory. The memory 14 is, for example, a rewritable memory such as a synchronous semiconductor memory (SDRAM: Synchronous Dynamic Random Access Memory), or the like. The image processor 12 stores the image data that has undergone various types of image processing stored in the memory 14 in the recording medium 15 or displays the image data on the display device 16 based on the input signal from the input device 13.

The input device 13 includes various types of switches such as a shutter button, a menu button, a touch panel, and the like operated by a user. The various types of switches are, for example, used to take pictures and set photography conditions and the display format.

A portable memory card such as a compact flash (registered trademark) or an SD (registered trademark) memory card may be used as the recording medium 15.

A liquid crystal display device (LCD) and an organic EL (Electronic Luminescence), for example, may be used for the display device 16. Furthermore, an electronic view finder (EVF) and an interface (e.g., HDMI (registered trademark): High-Definition Multimedia Interface) for external connection may also be used for the display device 16.

An internal configuration example of the image processor 12 will now be described.

The image processor 12 includes a CPU (Central Processing Unit) 20, a sensor interface (I/F) 21, an image signal processing unit 22, a memory I/F 23, a codec unit 24, a recording medium I/F 25, and a display device I/F 26. The CPU 20, the sensor I/F 21, the image signal processing unit 22, the memory I/F 23, the codec unit 24, the recording medium I/F 25, and the display device I/F 26 are electrically connected to each other by a bus 27.

The CPU 20 controls the entire image processor 12. The CPU 20, for example, sets information used for processing to each processing unit and controls the writing and reading of data. The CPU 20 sets an operation mode and information (parameters) used for each process according to the operation of the input device 13.

The sensor I/F 21 receives the captured data SA (image data of RGB format) output from the imaging device 11 and performs a predetermined correction process on the captured data SA. The sensor I/F 21 stores the image data that has undergone the correction process in the memory 14 through the memory I/F 23. The correction process performed on to the captured data SA includes, for example, a sensor linearity correction, a noise removing process, and a compression/decompression process.

The image signal processing unit 22 reads the image data stored in the memory 14, and performs a predetermined image processing on the image data. The image signal processing unit 22 stores the image data of after the image processing in the memory 14 through the memory I/F 23. The image processing in the image signal processing unit 22 includes, for example, a color space conversion process of converting the image data of RGB format to image data of YCbCr format, a resolution conversion process of increasing/decreasing the number of pixels of the image data, an edge enhancement process for enhancing the contour (edge) of the image, and the like.

The codec unit 24 reads the image data that has undergone image processing from the memory 14, and encodes the image data with a predetermined format (e.g., JPEG (Joint Photographic Experts Group) method). The codec unit 24 stores the encoded image data (encoded data) in the memory 14 through the memory I/F 23.

The recording medium I/F 25 is connected to the recording medium 15 attached to the electronic device 10. The recording medium I/F 25 stores the data stored in the memory 14 (e.g., encoded data) in the recording medium 15.

The display device 16 arranged in the electronic device 10 is connected to the display device I/F 26. The display device 16 is used to illustrate the state of charge of a battery, which is a drive source of the electronic device 10, a photographing mode, a photographing frame, and the stored image data, and the like. For example, the display device I/F 26 reads the data stored in the memory 14, and outputs the display data generated based on the data to the display device 16.

An internal configuration example of the sensor I/F 21 will now be described.

Figure 2:
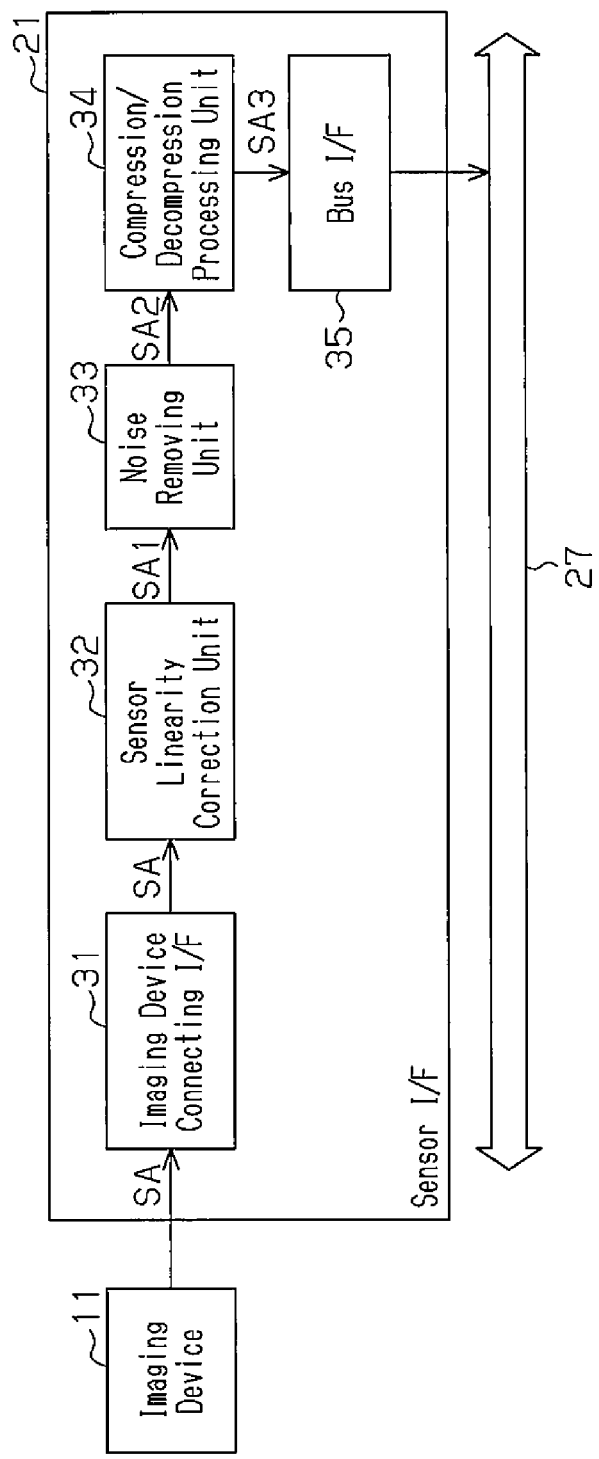
FIG. 2 is a block diagram illustrating an internal configuration example of a sensor I/F.

As illustrated in FIG. 2, the sensor I/F 21 includes an imaging device connecting I/F 31, a sensor linearity correction unit 32, a noise removing processing unit 33, a compression/decompression processing unit 34, and a bus I/F 35.

The imaging device connecting I/F 31 receives the captured data SA output from the imaging device 11, and outputs the captured data SA to the sensor linearity correction unit 32. A data structure of the captured data SA output from the imaging device connecting I/F 31 will be described below.

Figures 3A, 3B:
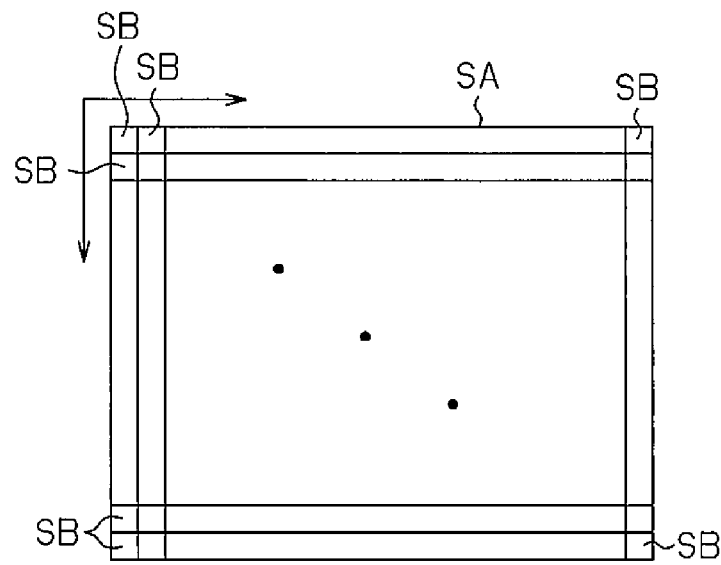
FIGS. 3A and 3B are explanatory diagrams illustrating the data structure of captured image.

As illustrated in FIG. 3A, the captured data SA of one frame (one screen) includes plural pieces of pixel data SB. The pixel data SB arranged in a sideward direction in FIG. 3A corresponds to a plurality of light receiving units arranged in a first direction (e.g., horizontal direction) of the imaging element 11A, and the pixel data SB arranged in an up and down direction in FIG. 3A corresponds to a plurality of light receiving units arranged in a second direction (e.g., vertical direction) orthogonal to the first direction of the imaging element 11A. Each pixel data SB includes a value (pixel value) corresponding to the amount of light received by the corresponding light receiving unit. The light receiving unit of the imaging element 11A receives the light transmitted through a color filter in a predetermined arrangement (e.g., Bayer arrangement). Therefore, the pixel value included in each pixel data SB includes color information corresponding to the arrangement and the color of the corresponding color filter. For example, the color filter of the Bayer arrangement includes a red (R) filter, a green (G) filter, and a blue (B) filter. Thus, the captured data SA includes plural pieces of pixel data SB, and each pixel data SB includes the color information (red (R) component, green (G) component, blue (B) component) of the corresponding one of the colors.

FIG. 3B illustrates the color information included in each pixel data SB and the arrangement position of the pixel data SB. Various types of processing will be described below using the captured data SA illustrated in FIG. 3B.

The captured data SA illustrated in FIG. 3B includes eight line data L1 to L8. Each line data L1 to L8 has eight pixel data SB. In FIG. 3B, "R" indicates a case in which the pixel data SB includes the color information of the red (R) component, "G" indicates a case in which the pixel data SB includes the color information of the green (G) component, and "B" indicates a case in which the pixel data SB includes the color information of the blue (B) component.

Furthermore, in FIG. 3B, each pixel data SB is indicated as "color information (R component, G component, B component) XY", where X (X=1 to 8) indicates the position of the row (line data) of the pixel data arranged in the sideward direction and Y (Y=1 to 8) indicates the position of the column of the pixel data arranged in the longitudinal direction. For example, the pixel data SB in the first row and first column of the captured data SA is the pixel data of the R component and is thus expressed as "R11". In the same manner, the pixel data SB in the first row and second column of the captured data SA is the pixel data of the G component and is thus expressed as "G12", the pixel data SB in the second row and first column of the captured data SA is the pixel data of the G component and thus is expressed as "G21", and the pixel data SB in the second row and second column of the captured data SA is the pixel data of the B component and is thus expressed as "B22". In the following description, when describing each pixel data SB using the color information (color component), description will be made using a reference symbol (color information (R component, G component, B component) XY) illustrated in FIG. 3B. For example, the pixel data SB in the first row and first column will be described as the pixel data R11. Furthermore, in the following description, the pixel data of the R component may be referred to as an R pixel, the pixel data of the G component may be referred to as a G pixel, and the pixel data of the B component may be referred to as a B pixel.

Figure 21:
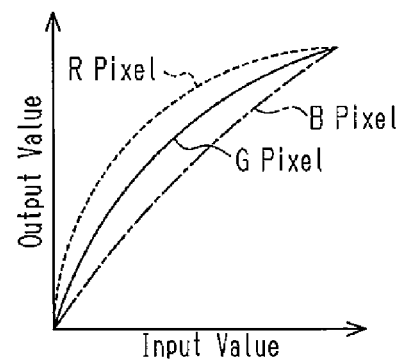
FIG. 21 is a characteristic diagram illustrating a correction curve used for sensor linearity correction.

As illustrated in FIG. 2, the sensor linearity correction unit 32 receives the captured data SA from the imaging device connecting I/F 31. The sensor linearity correction unit 32 performs the sensor linearity correction on the received captured data SA, and outputs image data SA1 that has undergone the correction process to the noise removing processing unit 33. The sensor linearity correction is, for example, executed by a correction process (LUT correction process) using a lookup table (LUT). The LUT is a table illustrating an output value (pixel value that has undergone the sensor linearity correction) corresponding to the input value (pixel value of the pixel data SB to input). A characteristic curve indicating the characteristics of the output value corresponding to the input value of the LUT becomes a correction curve for the sensor linearity correction (see FIG. 21). As illustrated in FIG. 21, a correction curve for dedicated each color information (color component), that is, a correction curve for the R pixel, a correction curve for the G pixel, and a correction curve for the B pixel are prepared as the correction curve for the sensor linearity correction.

In the LUT correction process by the sensor linearity correction unit 32, the pixel value (input value) of each pixel data SB included in the captured data SA is provided as an address value of the RAM in which the LUT is stored. In the LUT correction process, the output value of the RAM corresponding to the address value is output as the pixel data that has undergone the sensor linearity correction to realize the LUT correction (sensor linearity correction) with respect to the input value.

The noise removing processing unit 33, for example, performs a noise removing process for removing noise contained in the image data SA with respect to the image data SA1 that has undergone the sensor linearity correction. The noise removing processing unit 33 outputs image data SA2 of after the noise is removed to the compression/decompression processing unit 34.

Figure 11A:
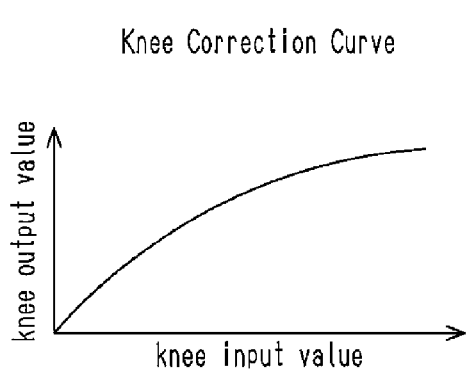
FIG. 11A is a characteristic diagram illustrating a Knee correction curve.
Figure 11B:
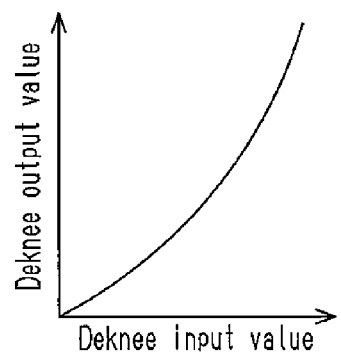
FIG. 11B is a characteristic diagram illustrating a Deknee correction curve.

The compression/decompression processing unit 34, for example, compresses (Knee process) and thereafter decompresses (Deknee process) the image data SA2 provided from the noise removing processing unit 33 to narrow the band when writing data or reading data from the memory 14. The compression/decompression processing unit 34 outputs image data SA3 that has undergone the compression/decompression process to the bus I/F 35. The compression process (Knee process) is executed by the LUT correction process using the LUT, for example. The LUT is a table illustrating an output value (image data of after the compression process) corresponding to the input value (e.g., image data SA2). A characteristic curve indicating the characteristics of the output value corresponding to the input value of the LUT becomes a Knee correction curve as illustrated in FIG. 11A. The decompression process (Deknee process) is executed by the LUT correction process using the LUT. The LUT is a table illustrating the output value (image data of after the decompression process) corresponding to the input value (e.g., image data f after the compression process). A characteristic curve indicating the characteristics of the output value corresponding to the input value of the LUT forms a Deknee correction curve as illustrated in FIG. 11B.

In the LUT correction process performed by the compression/decompression processing unit 34, the image data SA2 (input value) is input as an address value of the RAM in which the LUT (Knee correction curve or Deknee correction curve) is stored. In the LUT correction process, the LUT correction (compression/decompression process) is performed on the input value by outputting the output value of the RAM corresponding to the address value as the pixel data of after the compression process or after the decompression process.

The bus I/F 35 is connected to the bus 27. The bus I/F 35 stores the image data that has undergone the compression/decompression process in the memory 14 (see FIG. 1) through the bus 27.

An internal configuration example and an operation of the sensor linearity correction unit 32 will now be described.

Figure 4:
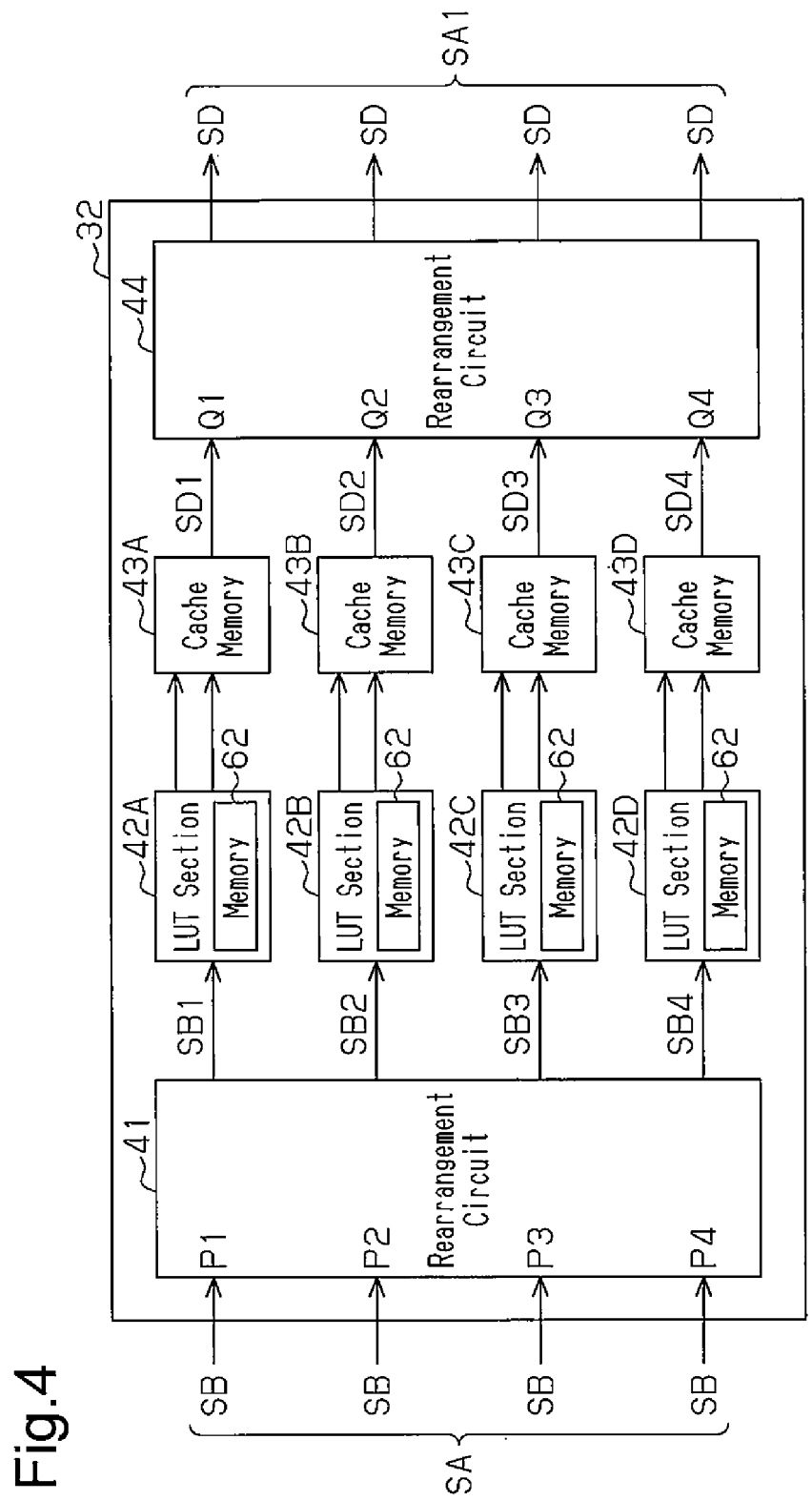
FIG. 4 is a block diagram illustrating an internal configuration example of a sensor linearity correction unit in the first embodiment.

As illustrated in FIG. 4, the sensor linearity correction unit 32 includes a rearrangement circuit 41, a plurality of (four herein) LUT sections 42A to 42D, cache memories 43A to 43D arranged in correspondence with the LUT sections 42A to 42D, and a rearrangement circuit 44.

The pixel data SB in a plurality of lines (four lines) of the captured data SA are provided in parallel to the sensor linearity correction unit 32 (rearrangement circuit 41). For example, the pixel data SB included in the line data L1 to L4 are provided in parallel. Then, the pixel data SB included in the line data L5 to L8 are provided in parallel to the sensor linearity correction unit 32 (rearrangement circuit 41). The process performed on the line data L1 to L4 and the process performed on the line data L5 to L8 are similar processes.

Thus, the following description will focus on only the process associated with the line data L1 to L4.

The rearrangement circuit 41 includes a plurality of (four herein) input terminals P1 to P4. As illustrated in FIG. 6A, the pixel data SB included in the line data L1 to L4 are provided in parallel (simultaneously) to the input terminals P1 to P4. For example, the pixel data R11, G21, R31, G41 in the first column of the line data L1 to L4 are provided in parallel (simultaneously). Then, the pixel data G12, B22, G32, B42 in the second column are provided in parallel (simultaneously) to the input terminals P1 to P4. In the same manner, then, the four pixel data in the same column of the line data L1 to L4 are provided in parallel sequentially to the input terminals P1 to P4. The R pixel and the G pixel are alternately provided to the input terminals P1, P3. The G pixel and the B pixel are alternately provided to the input terminals P2, P4.

The rearrangement circuit 41 first interchanges the pixel data SB of the line data L1 to L4 provided to each of the input terminals P1 to P4 as illustrated with an arrow in FIG. 6A. In other words, the R pixel of the line data L1 and the G pixel of the line data L2 are interchanged, and the G pixel of the line data L3 and the B pixel of the line data L4 are interchanged. Thus, as illustrated in FIG. 6B, only the G pixels are arranged in the line data L1A and L4A that has undergone the rearranging, the R pixels and the B pixels are alternately arranged in the line data L2A (fifth line data), and the R pixels and the B pixels are alternately arranged in the line data L3A (sixth line data). Furthermore, the rearrangement circuit 41 interchanges the pixel data SC1 to SC4 of the line data L1A to L4A that has undergone the rearranging described above, as illustrated with an arrow in FIG. 6B. In other words, the B pixel of the line data L2A and the R pixel of the line data L3A are interchanged. Thus, as illustrated in FIG. 6C, only the R pixels are arranged in the line data L2B of after the second rearranging, and only the B pixels are arranged in the line data L3B. In other words, the pixel data SB1 included in the line data L1B are all G pixels, the pixel data SB2 included in the line data L2B are all R pixels, the pixel data SB3 included in the line data L3B are all B pixels, and the pixel data SB4 included in the line data L4B are all G pixels. Thus, in the rearrangement circuit 41, the pixel data SB provided to the input terminals P1 to P4 are rearranged such that only the pixel data of one color component is arranged (arrayed) in one line data L1B to L4B.

As illustrated in FIG. 4, the rearrangement circuit 41 outputs the pixel data SB1 to the LUT section 42A, outputs the pixel data SB2 to the LUT section 42B, outputs the pixel data SB3 to the LUT section 42C, and outputs the pixel data SB4 to the LUT section 42D. Thus, only the G pixels are provided to the LUT sections 42A and 42D, only the R pixels are provided to the LUT section 42B, and only the B pixels are provided to the LUT section 42C.

An example of an internal configuration of the rearrangement circuit 41 that performs the rearranging described above will now be described.

Figure 5:
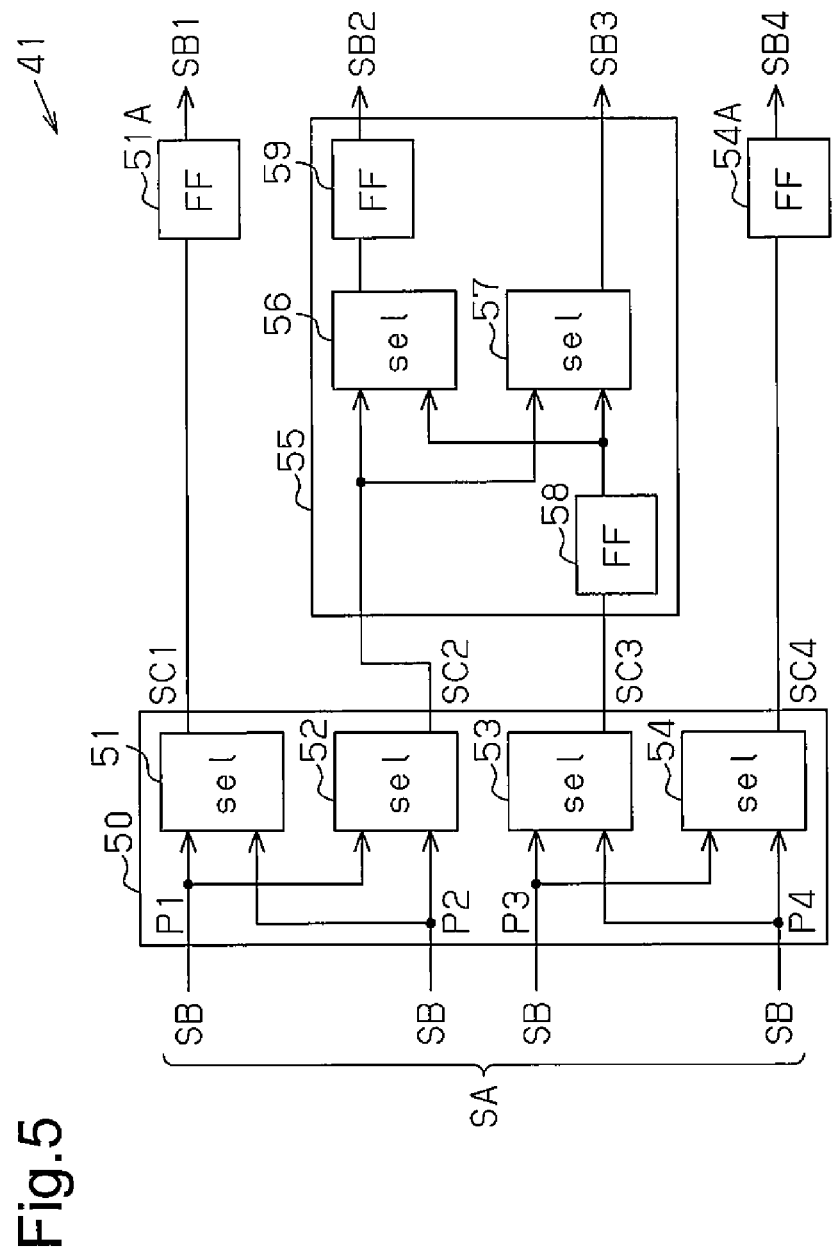
FIG. 5 is a block diagram illustrating an internal configuration example of a rearrangement circuit in the first embodiment.

As illustrated in FIG. 5, the rearrangement circuit 41 includes a rearranging unit 50 and a rearranging unit 55. The rearranging unit 50 includes four selection circuits 51 to 54. The rearranging unit 55 includes two selection circuits 56 and 57 and two flip-flop circuits (FF circuit) 58 and 59.

Two input terminals, namely, the input terminal P1 and the input terminal P2, are connected to both of the selection circuit 51 and the selection circuit 52. Thus, two pixel data, the pixel data SB of the line data L1 and the pixel data SB of the line data L2, for example, are simultaneously provided to the selection circuits 51, 52. Each selection circuit 51, 52 alternately selects the pixel data SB of the line data L1 and the pixel data SB of the line data L2 based on the synchronization signal (not illustrated), for example, and outputs the selected pixel data SB as pixel data SC1 or SC2. The selection circuit 51 and the selection circuit 52 select the pixel data SB of the line data different from each other. For example, as illustrated in FIGS. 6A and 6B, when the pixel data SB (pixel data R11, R13, R15, R17, i.e., R pixel) in the odd-ordered columns of the line data L1 are selected in the selection circuit 52, the pixel data SB (pixel data G21, G23, G25, G27, i.e., G pixel) in the odd-ordered columns of the line data L2 are selected in the selection circuit 51. Furthermore, when the pixel data SB (pixel data G12, G14, G16, G18, i.e., G pixel) in the even-ordered columns of the line data L1 are selected in the selection circuit 51, the pixel data SB (pixel data B22, B24, B26, B28, i.e., B pixel) in the even-ordered columns of the line data L2 are selected in the selection circuit 52. The rearranging illustrated with the arrow in FIG. 6A is carried out in the line data L1, L2 by the selection circuits 51, 52.

As illustrated in FIG. 5, two input terminals, namely, the input terminal P3 and the input terminal P4 are connected to both of the selection circuit 53 and the selection circuit 54. Thus, two pixel data, the pixel data SB of the line data L3 and the pixel data SB of the line data L4, for example, are simultaneously provided to the selection circuits 53, 54. Each selection circuit 53, 54 alternately selects the pixel data SB of the line data L3 and the pixel data SB of the line data L4 based on the synchronization signal (not illustrated), for example, and outputs the selected pixel data SB as pixel data SC3 or SC4. The selection circuit 53 and the selection circuit 54 select the pixel data SB of different line data. For example, as illustrated in FIGS. 6A and 6B, when the pixel data SB (pixel data R31, R33, R35, R37, i.e., R pixel) in the odd-ordered columns of the line data L3 are selected in the selection circuit 53, the pixel data SB (pixel data G41, G43, G45, G47, i.e., G pixel) in the odd-ordered columns of the line data L4 are selected in the selection circuit 54. Furthermore, when the pixel data SB (pixel data G32, G34, G36, G38, i.e., G pixel) in the even-ordered columns of the line data L3 are selected in the selection circuit 54, the pixel data SB (pixel data B42, B44, B46, B48, i.e., B pixel) in the even-ordered columns of the line data L4 are selected in the selection circuit 53. The rearranging illustrated with the arrow in FIG. 6A is carried out in the line data L3, L4 by the selection circuits 53, 54.

The line data L1A to L4A are respectively output from the selection circuits 51 to 54 described above. The line data L1A to L4A respectively includes the pixel data SC1 to SC4 that has undergone the rearranging performed by the rearranging unit 50.

The pixel data SC1 is provided to the FF circuit 51A. The FF circuit 51A, for example, delays the pixel data SC1 by one clock of the synchronization signal (not illustrated), and outputs the delayed signal as pixel data SB1. For example, the FF circuit 51A latches the pixel data SC1 in response to a rising edge of the synchronization signal, and outputs a signal of a level equal to the latch level as the pixel data SB1 in response to the rising edge of the next synchronization signal.

The pixel data SC4 is provided to the FF circuit 54A. The FF circuit 54A, for example, delays the pixel data SC4 by one clock of the synchronization signal (not illustrated), and outputs the delayed signal as pixel data SB4.

The pixel data SC2 (line data L2A illustrated in FIG. 6B) is provided to the selection circuits 56, 57 in the rearranging unit 55. The pixel data SC3 (line data L3A illustrated in FIG. 6B) is provided to the FF circuit 58. The FF circuit 58, for example, delays the pixel data SC2 by one clock of the synchronization signal (not illustrated), and outputs the delayed output signal to the selection circuits 56, 57.

The pixel data SC2 and the output signal of the FF circuit 58 are provided to the selection circuits 56, 57. For example, as illustrated in FIG. 6B, with the pixel data B22 in the second column of the line data L2A, the pixel data R31 one clock before (one column before) the pixel data B22, that is, the pixel data R31 in the first column of the line data L3A is provided to the selection circuits 56, 57. The selection circuit 56, for example, alternately selects the pixel data SC2 and the output signal of the FF circuit 58 based on the synchronization signal (not illustrated), and outputs the selected pixel data to the FF circuit 59. The selection circuit 57, for example, alternately selects the pixel data SC2 and the output signal of the FF circuit 58 based on the synchronization signal (not illustrated), and outputs the selected pixel data as pixel data SB3. The selection circuit 56 and the selection circuit 57 select the different pixel data SC2 and SC3. For example, as illustrated in FIGS. 6B and 6C, when the pixel data SC2 (B pixel) in the even-ordered columns of the line data L2A are selected in the selection circuit 57, the pixel data SC3 (R pixel) in the odd-ordered columns of the line data L3A are selected in the selection circuit 56. Furthermore, when the pixel data SC2 (R pixel) in the odd-ordered columns of the line data L2A are selected in the selection circuit 56, the pixel data SC3 (B pixel) in the even-ordered columns of the line data L3A are selected in the selection circuit 57.

The FF circuit 59, for example, delays the output signal of the selection circuit 56 by one clock of the synchronization signal (not illustrated), and outputs the delayed signal as the pixel data SB2.

The rearranging illustrated with the arrow in FIG. 6B is carried out in the line data L2A, L3A by the rearranging unit 55 (selection circuits 56, 57 and FF circuits 58, 59) described above. Plural pieces of pixel data SB1 to SB4 is output in parallel from the rearrangement circuit 41.

As illustrated in FIG. 4, the pixel data SB1 is provided to the LUT section 42A and undergoes the LUT correction (sensor linearity correction herein) performed by the LUT section 42A and the cache memory 43A. The pixel data SB2 is provided to the LUT section 42B and undergoes the sensor linearity correction performed by the LUT section 42B and the cache memory 43B. The pixel data SB3 is provided to the LUT section 42C and undergoes the sensor linearity correction performed by the LUT section 42C and the cache memory 43C. The pixel data SB4 is provided to the LUT section 42D and undergoes the sensor linearity correction performed by the LUT section 42D and the cache memory 43D.

An internal configuration example of the LUT section 42A and the cache memory 43A will now be described with reference to FIGS. 7 and 8.

Figure 7:
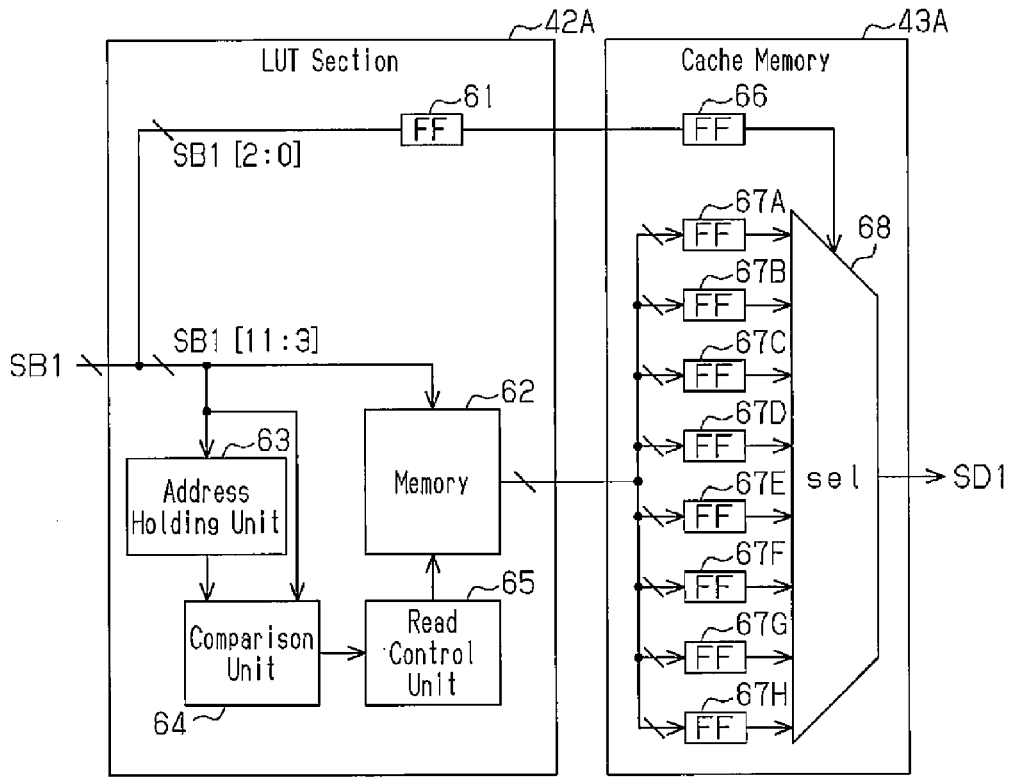
FIG. 7 is a block diagram illustrating an internal configuration example of an LUT section and a cache memory.

As illustrated in FIG. 7, the LUT section 42A includes an FF circuit 61, a memory 62, an address holding unit 63, a comparison unit 64, and a read control unit 65.

The pixel data SB1 is data of a plurality of bits (12 bits herein). The 12-bit pixel data SB1 [11:0] is divided into high-order bit data SB1 [11:3], which is the higher nine bits, and the low-order bit data SB1 [2:0], which is the lower three bits, and provided to the LUT section 42A. Specifically, the low-order bit data SB1 [2:0] is provided to the FF circuit 61, and the high-order bit data SB1 [11:3] is provided to the memory 62, the address holding unit 63, and the comparison unit 64.

The FF circuit 61 delays, for example, the low-order bit data SB1 [2:0] by one clock of the synchronization signal (not illustrated) and outputs the delayed signal to an FF circuit 66 in the cache memory 43A.

The memory 62 is, for example, a RAM (Random Access Memory). A correction curve for the sensor linearity correction (see FIG. 21) described above, that is, a table illustrating a correspondence relationship of the input value (pixel value of the pixel data SB1) and the output value (pixel value that has undergone the sensor linearity correction) is stored in the memory 62. In detail, since only the G pixels are provided to the LUT section 42A, the correction curve for the G pixel is stored in the memory 62 of the LUT section 42A.

In the memory (e.g., RAMs 205A to 205D, 206A to 206D) of the LUT sections 202A to 202D in the related art, one output value (LUT data, that is, corrected data) is stored in one address specified by one input value.

Figure 8:
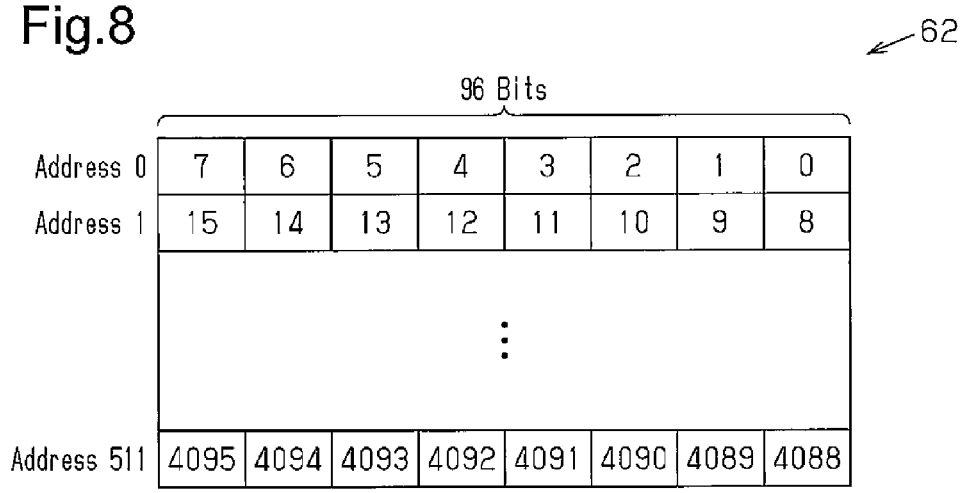
FIG. 8 is an explanatory diagram illustrating the data structure of a memory.

In contrast, as illustrated in FIG. 8, eight output values (corrected data) are stored in one address in the memory 62 of the present example. In detail, 4096 output values of "0" to "4095" that may be selected (specified) by the 12-bit pixel data SB1 are stored in the memory 62. The memory 62, however, does not have 4096 addresses, and only has 512 addresses, "0" to "511", that may be selected by the high-order bit data SB1 [11:3] of nine bits. Eight output vales that may be selected by the low-order bit data SB1 [2:0] of three bits are stored in each address of the memory 62. Each output value is data having 12 bits and is the same as the pixel data SB1. Thus, 96 bits of data are stored in each address of the memory 62.

For example, eight output values of "0" to "7" corresponding to the input values (pixel data SB1) of "0" to "7" are stored in the address 0 of the memory 62, and eight output values of "8" to "15" corresponding to the input values (pixel data SB1) of "8" to "15" are stored in the address 1 of the memory 62. Then, in the same manner, eight output values are stored in each address of the memory 62, and eight output values of "4088" to "4095" corresponding to the input values of "4088" to "4095" are stored in the final address 511 of the memory 62.

As illustrated in FIG. 7, eight output values stored in the address specified by the high-order bit data SB1 [11:3] are output from the memory 62 to the cache memory 43A. In other words, 96 bits of data are output from the memory 62.

The address holding unit 63 holds the high-order bit data SB1 [11:3] that is the address value of the memory 62. For example, the address holding unit 63 holds the high-order bit data SB1 [11:3] for one clock of the synchronization signal, and outputs the held high-order bit data SB1 [11:3] to the comparison unit 64 as a previous address value.

The comparison unit 64 compares the high-order bit data SB1 [11:3] and the address value from the address holding unit 63. In other words, the comparison unit 64 compares the current address value (high-order bit data SB1 [11:3]) and the previous address value, and outputs the comparison result to the read control unit 65.

The read control unit 65 stops the read operation (i.e., reading operation of the output value) in the memory 62 if the address at the current and previous address values match. In other words, if the high-order bit data SB1 [11:3] of the two pixel data SB1 continuously provided to the LUT section 42A are the same, the read operation in the memory 62 is stopped. In this case, the output value is not output from the memory 62. In contrast, the read control unit 65 executes the read operation in the memory 62 if the current address value and the previous address value do not match.

In this case, eight output values are output from the memory 62 to the cache memory 43A.

The cache memory 43A includes the FF circuit 66, a plurality of (eight herein) FF circuits 67A to 67H, and a selection circuit 68 connected to the FF circuits 67A to 67H.

The FF circuit 66, for example, delays the output signal of the FF circuit 61 by one clock of the synchronization signal (not illustrated), and outputs the delayed signal to the selection circuit 68 as a selected signal. In other words, the FF circuits 61, 66 delay the low-order bit data SB1 [2:0] by two clocks of the synchronization signal when provided to the selection circuit 68.

The eight output values read from the memory 62 are respectively held in the eight FF circuits 67A to 67H. In other words, the eight output values read from the memory 62 are each held in different FF circuits 67A to 67H. For example, if the output values of "0" to "7" are read from the memory 62, the output value of "0" is held in the FF circuit 67A, the output value of "1" is held in the FF circuit 67B, the output value of "2" is held in the FF circuit 67C, and the output value of "3" is held in the FF circuit 67D. Furthermore, in this case, the output value of "4" is held in the FF circuit 67E, the output value of "5" is held in the FF circuit 67F, the output value of "6" is held in the FF circuit 67G, and the output value of "7" is held in the FF circuit 67H. The FF circuits 67A to 67H each output the held output value to the selection circuit 68.

The selection circuit 68 selects one output value from the eight output values provided from the FF circuits 67A to 67H based on the output signal of the FF circuit 66. In other words, the selection circuit 68 selects one output value from the eight output values read from one address of the memory 62 based on the low-order bit data SB1 [2:0] of three bits. The selection circuit 68 then outputs the selected output value as pixel data SD1. In this case, the pixel data SD1 becomes the data obtained by undergoing the LUT correction process (sensor linearity correction herein) on the pixel data SB1, which is the input value. In other words, the pixel data SD1 (G pixel) that has undergone the sensor linearity correction is output from the cache memory 43A (selection circuit 68).

For example, if the pixel data SB1 provided to the LUT section 42A is "4", the address 0 of the memory 62 is selected, and eight output values of "0" to "7" are output from the memory 62. The output values of "0" to "7" are respectively stored in the corresponding FF circuits 67A to 67H. In this case, the low-order bit data SB1 [2:0] becomes "4", and the output value of "4" is thus output from the selection circuit 68 as the pixel data SD1. Then, if the pixel data SB1 provided after the pixel data SB1 of "4" is one of "0" to "7", the value (address value) of the high-order bit data SB1 [11:3] becomes "0", the same as the previous case of "4". Thus, in this case, the read operation of the memory 62 is stopped by the read control unit 65, and the output values (output values of "0" to "7" herein) held in the eight FF circuits 67A to 67H are continuously provided to the selection circuit 68. In this case, if the low-order bit data SB1 [2:0] is "3", the output value of "3" is output from the selection circuit 68 as the pixel data SD1.

The LUT sections 42B to 42D illustrated in FIG. 4 have substantially the same configuration as the LUT section 42A illustrated in FIG. 7, and the cache memories 43B to 43D illustrated in FIG. 4 have substantially the same configuration as the cache memory 43A illustrated in FIG. 7 thus will not be described in detail. However, since only the R pixel is provided to the LUT section 42B, the correction curve for the R pixel (see FIG. 21) is stored in the memory 62 of the LUT section 42B. In the same manner, the correction curve for the B pixel (see FIG. 21) is stored in the memory 62 of the LUT section 42C, and the correction curve for the G pixel (see FIG. 21) is stored in the memory 62 of the LUT section 42D.

The pixel data SD2 obtained by performing the LUT correction (sensor linearity correction) on the pixel data SB2 is output from the cache memory 43B. In the same manner, the pixel data SD3 that has undergone the sensor linearity correction is performed on the pixel data SB3 is output from the cache memory 43C, and the pixel data SD4 obtained by performing the sensor linearity correction on the pixel data SB4 is output from the cache memory 43D.

Four pixel data SD1 to SD4 are provided in parallel from the cache memories 43A to 43D to the rearrangement circuit 44. The rearrangement circuit 44 rearranges the pixel data SD1 to SD4 to return the rearranging order (arrangement) of the pixel data rearranged by the rearrangement circuit 41 to the original order.

Figure 9A:
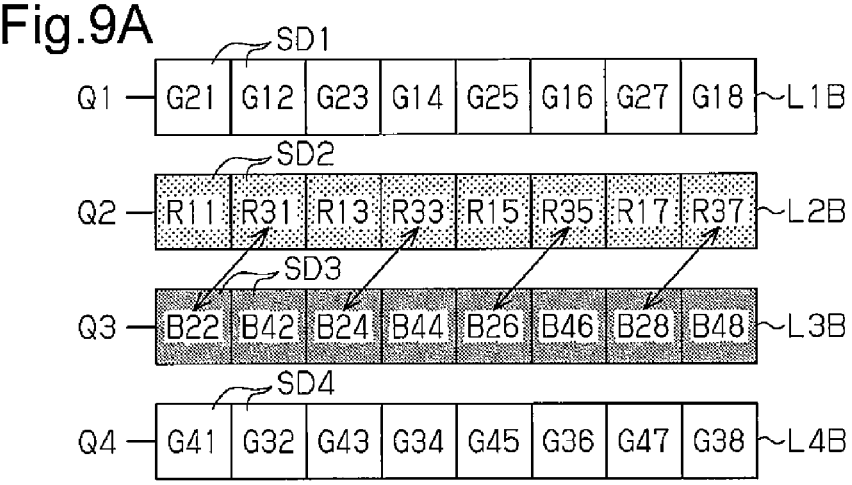
FIGS. 9A to 9C are explanatory diagrams illustrating the operation of the rearrangement circuit of the first embodiment.
Figure 9B:
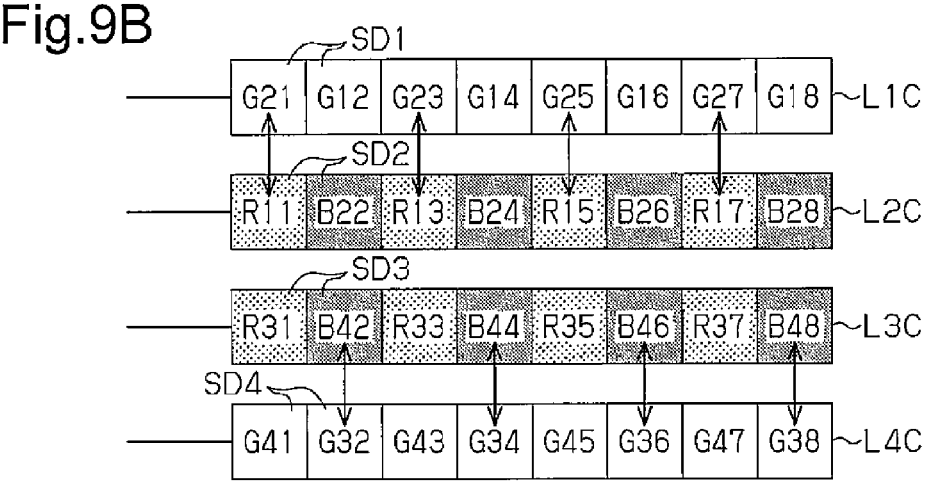

In detail, the rearrangement circuit 44 includes a plurality (four herein) of input terminals Q1 to Q4. As illustrated in FIG. 9A, the pixel data SD1 to SD4 included in the line data L1B to L4B are provided in parallel to the input terminals Q1 to Q4. For example, the pixel data G21, R11, B22, G41 in the first column of the line data L1B to L4B are provided in parallel (simultaneously), and then the pixel data G12, R31, B42, G32 in the second column are provided in parallel (simultaneously) to the input terminals Q1 to Q4. Then, in the same manner, the four pixel data in the same column of the line data L1B to L4B are provided in parallel sequentially to the rearrangement circuit 44. Only the G pixels are provided to the input terminals Q1 and Q4, only the R pixels are provided to the input terminal Q2, and only the B pixels are provided to the input terminal Q3.

Figure 9C:
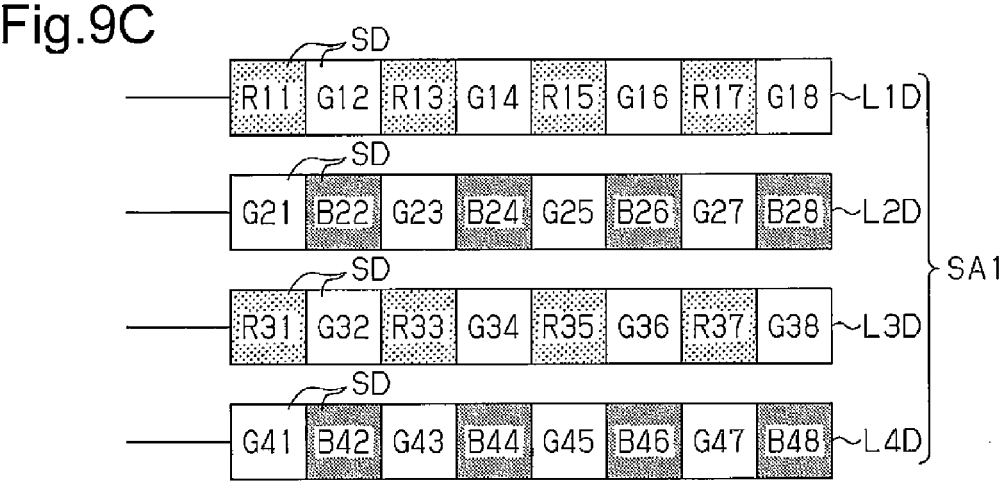

The rearrangement circuit 44 first interchanges the pixel data SD1 to SD4 of the line data L1B to L4B respectively provided to the input terminals Q1 to Q4 as illustrated by an arrow in FIG. 9A. In other words, the pixel data SD2 in the Nth column (N is an even number) of the line data L2B and the pixel data SD3 in the (N−1)th column of the line data L3B are interchanged. Thus, the R pixel and the B pixel are alternately arranged in the line data L2C, L3C that has undergone the rearranging. Furthermore, the rearrangement circuit 44 interchanges the pixel data SD1 to SD4 of the line data L1C to L4C that has undergone the rearranging described above as illustrated with an arrow in FIG. 9B. In other words, the pixel data SD1 in the Mth column (M is an odd number) of the line data L1C and the R pixel of the line data L2C are interchanged, and the B pixel of the line data L3C and the pixel data SD4 in the Nth column of the line data L4C are interchanged. Thus, as illustrated in FIG. 9C, the R pixel and the G pixel are alternately arranged (arrayed) in the line data L1D, L3D that has undergone the rearranging, and the G pixel and the B pixel are alternately arranged (arrayed) in the line data L2D, L4D that has undergone the rearranging. In other words, in the line data L1D to L4D, the pixel data SD after the sensor linearity correction are arranged (arrayed) in the same manner as the line data L1 to L4 (see FIG. 6A) provided to the sensor linearity correction unit 32.

The rearrangement circuit 44 then outputs the image data SA1 including the line data L1D to L4D, that is, the image data SA1 after the sensor linearity correction to the noise removing processing unit 33 illustrated in FIG. 2. The rearrangement circuit 44 may also be realized using a circuit similar to the rearranging units 50, 55 (see FIG. 5) of the rearrangement circuit 41. Thus, the internal configuration will not be illustrated and described.

An internal configuration example and an operation of the compression/decompression processing unit 34 will now be described.

Figure 10:
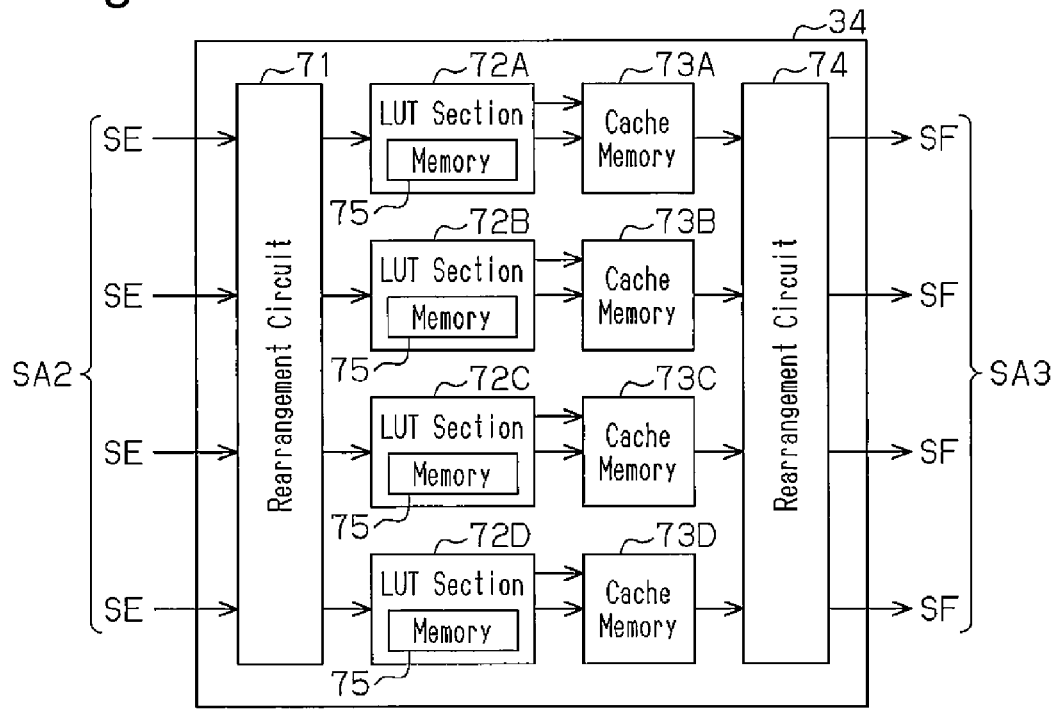
FIG. 10 is a block diagram illustrating an internal configuration example of a compression/decompression processing unit in the first embodiment.

As illustrated in FIG. 10, the compression/decompression processing unit 34 includes a rearrangement circuit 71, a plurality of (four herein) LUT sections 72A to 72D, cache memories 73A to 73D arranged in correspondence with the LUT section 72A to 72D, and a rearrangement circuit 74. The compression/decompression processing unit 34 is a circuit substantially similar to the sensor linearity correction unit 32 illustrated in FIG. 4. In other words, each of the rearrangement circuit 71, the LUT sections 72A to 72D, the cache memories 73A to 73D and the rearrangement circuit 74 are circuits similar to the rearrangement circuit 41, the LUT sections 42A to 42D, the cache memories 43A to 43D and the rearrangement circuit 44 illustrated in FIG. 4. Thus, each circuit of the compression/decompression processing unit 34 will not be described in detail.

The pixel data SE of a plurality of lines (for four lines herein) of the image data SA2 that has undergone the noise removing process are provided in parallel to the rearrangement circuit 71. The rearrangement circuit 71 rearranges the pixel data SE so that only the pixel data SE of one color component is provided to each LUT section 72A, 72B, 72C, 72D in a subsequent stage. In other words, the rearrangement circuit 71 rearranges the pixel data SE so that only the G pixels are provided to the LUT sections 72A, 72D, only the R pixels are provided to the LUT section 72B, and only the B pixels are provided to the LUT section 72C.

The pixel data that has undergone the rearranging is compressed or decompressed (LUT correction) by the LUT sections 72A to 72D and the cache memories 73A to 73D, and provided to the rearrangement circuit 74. The LUT sections 72A to 72D are circuits substantially similar to the LUT sections 42A to 42D illustrated in FIG. 4, and only differ in the data stored in a memory 75. In other words, the Knee correction curve (see FIG. 11A), that is, the table illustrating the correspondence relationship of the input value and the output value (value after the compression process), the Deknee correction curve (see FIG. 11B), that is, the table illustrating the correspondence relationship of the input value and the output value (value after the decompression process) are stored in the memory 75.

The rearrangement circuit 74 rearranges the pixel data that has undergone the LUT correction performed by the LUT sections 72A to 72D and the cache memories 73A to 73D to return the rearranging order (arrangement) of the pixel data rearranged by the rearrangement circuit 71 to the original order. The rearrangement circuit 74 then outputs the image data SA3 including the pixel data that has undergone the rearranging, that is, the pixel data SF that has undergone the compression/decompression process to the bus I/F 35 illustrated in FIG. 2.

The operation of the sensor I/F 21 (in particular, sensor linearity correction unit 32 and compression/decompression processing unit 34) will now be described.

In the rearrangement circuit 41 of the sensor linearity correction unit 32, the pixel data SB are rearranged so that only the pixel data of one color component is provided to each of the LUT sections 42A to 42D in the subsequent stage. Thus, the correction curve for the plurality of color components does not need to be prepared in one LUT section 42A to 42D. The number of memories 62 arranged in one LUT section 42A to 42D may thus be one. Therefore, even if the number of lines provided in parallel to the sensor linearity correction unit 32 is increased, an increase in the memory capacity in the sensor linearity correction unit 32 may be limited and the increase in the circuit area may be limited.

Furthermore, the pixel data SB1 to SB4 of 12 bits (A bits) after being rearranged by the rearrangement circuit 41 are provided in parallel to the LUT sections 42A to 42D of the sensor linearity correction unit 32. A plurality of output values is output from the address of the memory 62 specified by the upper nine bits (B bits) of each pixel data SB1 to SB4, and the output values are respectively held in the FF circuits 67A to 67H of the cache memories 43A to 43D. One output value of the plurality of output values held in the FF circuits 67A to 67H is output as the data that has undergone the LUT correction based on the lower three bits (A-B bits) of each pixel data SB1 to SM. If the upper nine bits of the pixel data provided next are the same as the previously provided upper nine bits, the output value does not need to be read from the memory 62 since the output value corresponding to the pixel data to be provided next is held in one of the FF circuits 67A to 67H. In other words, if the cache hit occurs, the output value does not need to be read from the memory 62. This reduces accessing of the memory 62, and the power consumption in the sensor linearity correction unit 32 may be reduced. The reason the power consumption may be reduced in the sensor linearity correction unit 32 will be described below.

Figure 12A:
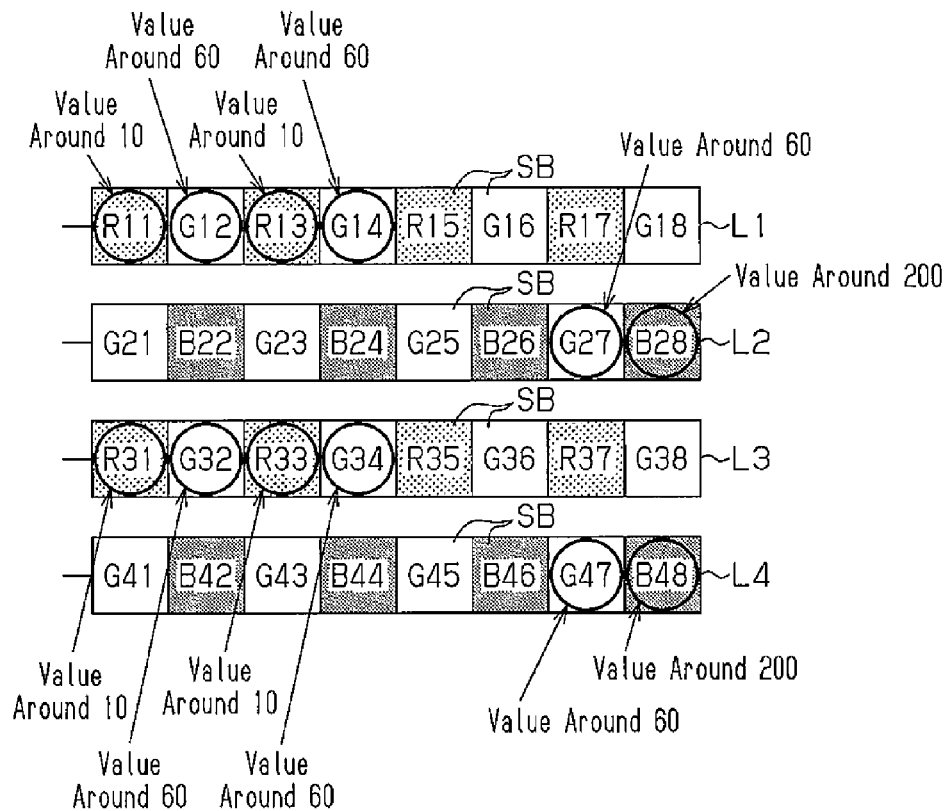
FIGS. 12A and 12B are explanatory diagrams illustrating the operation of the sensor linearity correction unit in the first embodiment.

For example, a case in which a subject captured by the imaging device 11 includes something having a continuously extending color such as a "blue sky". Here, the pixel value of the R pixel in the "blue sky" is a value around "10", the pixel value of the B pixel is a value around "200", and the pixel value of the G pixel is a value around "60". As illustrated in FIG. 12A, the pixel data SB (R pixel) of around "10" and the pixel data SB (G pixel) of around "60" are alternately arranged in the line data L1, L3 before the rearranging performed by the rearrangement circuit 41. In the line data L2, L4 before the rearranging, the pixel data SB (G pixel) of around "60" and the pixel data SB (B pixel) of around "200" are alternately arranged. Thus, if the rearrangement circuit 41 is omitted, the line data L1 to L4 in which the pixel value greatly changes whenever time the pixel data SB is provided are provided to the LUT sections 42A to 42D. In this case, the address value greatly changes whenever the pixel data SB is provided, and thus the eight output values need to be from the memory 62 each time the pixel data SB is provided. Therefore, if the rearrangement circuit 41 is omitted, the accessing of the memory 62 is practically not reduced even if the cache memories 43A to 43D are arranged in the subsequent stages of the LUT sections 42A to 42D. In other words, even if the cache memories 43A to 43D are merely arranged subsequent to the conventional LUT sections 202A to 202D, the accessing of the memories in the LUT sections 202A to 202D is practically not reduced.

Figure 12B:
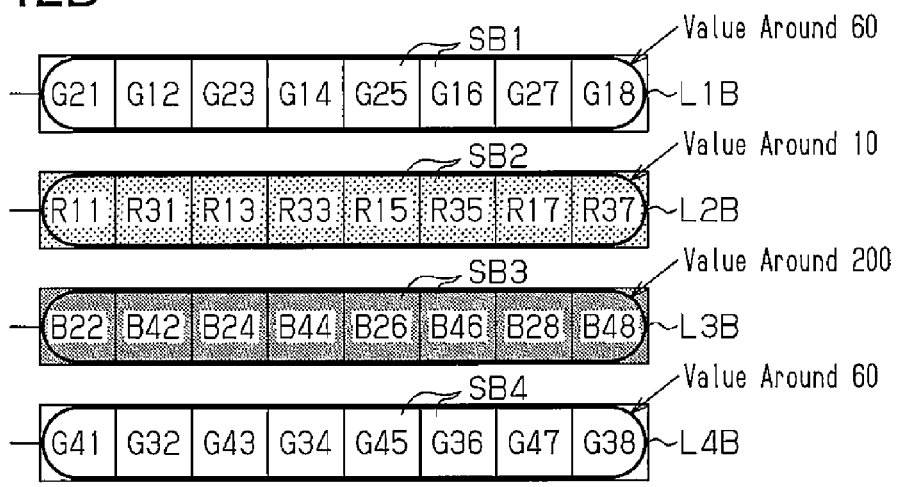

In contrast, the sensor linearity correction unit 32 of the first embodiment includes the rearrangement circuit 41, which rearranges the pixel data SB so that only the pixel data of one color component is provided to each of the LUT sections 42A to 42D, in addition to the cache memories 43A to 43D. As illustrated in FIG. 12B, the pixel data SB1, SB4 (G pixel) of around "60" are continuously arranged (arrayed) in the line data L1B, L4B rearranged by the rearrangement circuit 41. The pixel data SB2 of around "10" are continuously arranged in the line data L2B that has undergone the rearranging, and the pixel data SB3 (B pixel) of around "200" are continuously arranged in the line data L3B that has undergone the rearranging. Thus, the pixel data having close pixel values (address values) are successively provided to the LUT sections 42A to 42D due to the arrangement of the rearrangement circuit 41. The hit rate to the cache memories 43A to 43D is thereby enhanced. Therefore, accessing of the memory 62 may be reduced in a desirable manner, and the power consumption in the sensor linearity correction unit 32 may be reduced.

Like the sensor linearity correction unit 32, the compression/decompression processing unit 34 includes the rearrangement circuit 71, the LUT sections 72A to 72D and the cache memories 73A to 73D. This increases the hit rate to the cache memories 73A to 73D. The accessing of the memories 75 in the LUT sections 72A to 72D may thus be reduced in a desirable manner, and the power consumption in the compression/decompression processing unit 34 may be reduced.

The first embodiment has the advantages below.

(1) The rearrangement circuit 41 rearranges the plural pieces of pixel data SB so that only the pixel data of one color component is provided to each of the LUT sections 42A to 42D in the subsequent stages. Since the number of memories 62 arranged in one LUT section 42A to 42D is one, an increase in the memory capacity and the circuit area in the sensor linearity correction unit 32 is limited.

(2) The cache memories 43A to 43D are arranged in the subsequent stage of the LUT sections 42A to 42D along with the rearrangement circuit 41. Furthermore, the cache memories 73A to 73D are arranged at the subsequent stage of the LUT sections 72A to 72D along with the rearrangement circuit 71. The hit rate to the cache memories 43A to 43D, 73A to 73D is increased by the combination of the rearrangement circuit 41, 71 and the cache memories 43A to 43D, 73A to 73D.

(3) In the LUT sections 42A to 42D and 72A to 72D, the reading of the output value from the memories 62, 75 is stopped if the current address value (high-order bit data SB1 [11:3]) matches the previous address value. Thus, when a cache hit occurs, the accessing of the memories 62, 75 is reduced. Therefore, the accessing of the memories 62, 75 is suitably reduced, and the power consumption in the sensor linearity correction unit 32 and the compression/decompression processing unit 34 is reduced.

(4) In the rearrangement circuits 41, 71, the R pixel of the first line and the G pixel of the second line are interchanged, and the G pixel of the line data of the third line and the B pixel of the fourth line are interchanged. Furthermore, in the rearrangement circuits 41, 71, the B pixel of the second line that has undergone the rearranging and the R pixel of the third line that has undergone the rearranging are interchanged. The pixel data SB are rearranged in real time (promptly) in the rearrangement circuits 41, 71. For example, in the present example, only a delay of one clock of the synchronization signal occurs from the rearranging of the pixel data SB to the output of the rearranged pixel data.

(5) The rearrangement circuits 41, 71 are realized with a circuit that is simple and convenient, and that has a small circuit area, as illustrated in FIG. 5. The increase in the circuit area in the sensor linearity correction unit 32 and the compression/decompression processing unit 34 is thus suitably suppressed.

Second Embodiment

A second embodiment will now be described with reference to FIGS. 13 to 16. An electronic device 10 of the present embodiment differs from the first embodiment in the internal configuration of the sensor linearity correction unit and the compression/decompression processing unit. The following description will focus on the differences from the first embodiment. Like or same reference numerals are given to those components that are the same as the corresponding components illustrated in FIGS. 1 to 12. Such components will not be described in detail.

An internal configuration example and the operation of a sensor linearity correction unit 32A will now be described with reference to FIGS. 13 to 15. In the first embodiment described, the pixel data SB for four lines are provided in parallel to the sensor linearity correction unit 32. In the present example, the pixel data SB for two lines are provided in parallel to the sensor linearity correction unit 32A.

Figure 13:
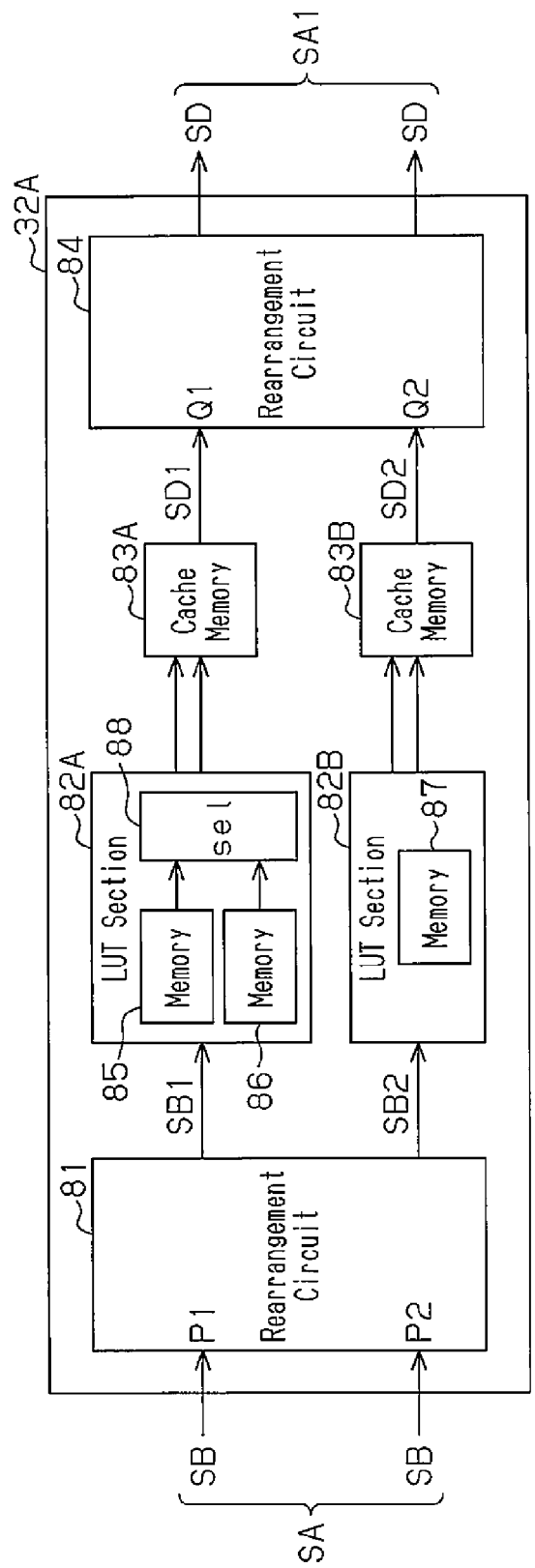
FIG. 13 is a block diagram illustrating an internal configuration example of a sensor linearity correction unit in a second embodiment.

As illustrated in FIG. 13, the sensor linearity correction unit 32A includes a rearrangement circuit 81, a plurality of (two herein) LUT sections 82A, 82B, cache memories 83A, 83B arranged in correspondence with the LUT section 82A, 82B, and a rearrangement circuit 84.

The pixel data SB for the two lines of the captured data SA are provided in parallel to the sensor linearity correction unit 32A (rearrangement circuit 81). For example, the pixel data SB included in the line data L1, L2 are provided in parallel to the sensor linearity correction unit 32A (rearrangement circuit 81). The following description will focus on only the processes associated with the line data L1, L2.

Figure 15A:
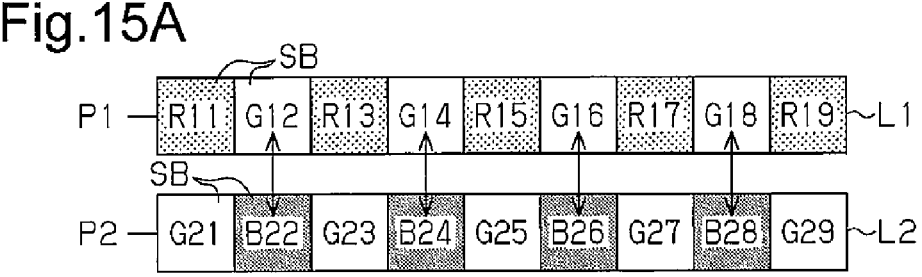
FIGS. 15A to 15C are explanatory diagrams illustrating the operation of the rearrangement circuit in the second embodiment.

The rearrangement circuit 81 includes two input terminals P1, P2. As illustrated in FIG. 15A, the pixel data SB included in the line data L1, L2 are provided in parallel (simultaneously) to the input terminals P1, P2. For example, the pixel data R11, G21 in the first column of the line data L1, L2 are provided in parallel (simultaneously) and then, the pixel data G12, B22 in the second column are provided in parallel (simultaneously) to the input terminals P1, P2. Then, in the same manner, the two pixel data SB in the same column of the line data L1, L2 are provided in parallel sequentially to the input terminals P1, P2.

Figure 15B:
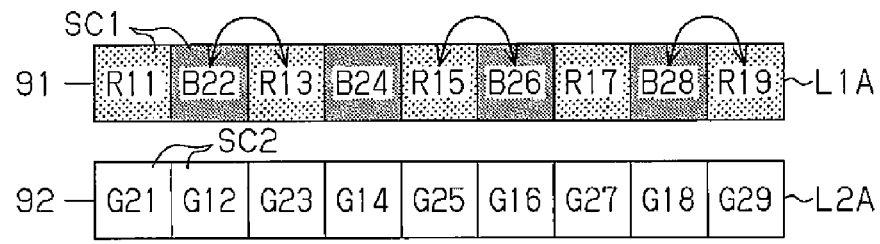
Figure 15C:
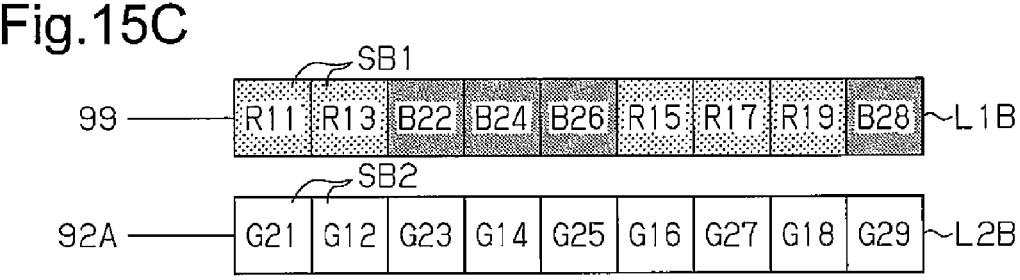

The rearrangement circuit 81 first interchanges the pixel data SB of the line data L1, L2 provided to the input terminals P1, P2, respectively, as illustrated with an arrow in FIG. 15A. In other words, the G pixel of the line data L1 and the B pixel of the line data L2 are interchanged. Thus, as illustrated in FIG. 15B, the R pixel and the B pixel are alternately arranged in the line data L1A (seventh line data) that has undergone the rearranging, and only the G pixels are arranged in the line data L2A. Furthermore, the rearrangement circuit 81 interchanges the pixel data SC1 of the line data L1A that has undergone the rearranging as illustrated with an arrow in FIG. 15B. In other words, as illustrated in FIG. 15C, the pixel data SC1 of the line data L1A are rearranged so that the three successive B pixels and the three successive R pixels are alternately arranged.

One example of an internal configuration of the rearrangement circuit 81 that performs the rearranging described above will now be described.

Figure 14:
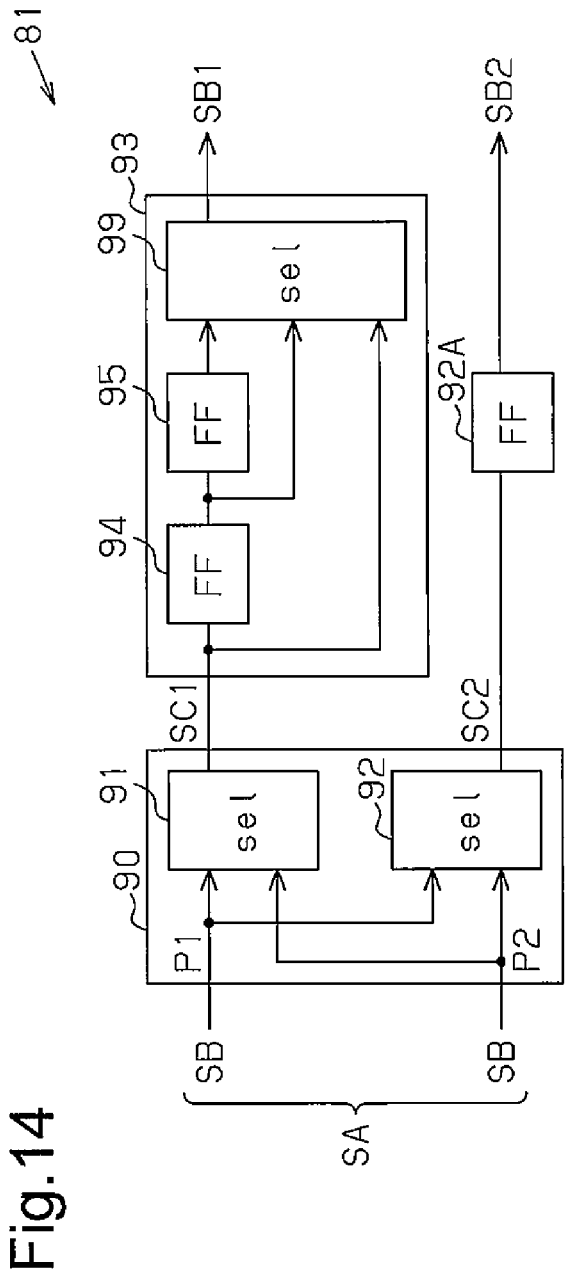
FIG. 14 is a block diagram illustrating an internal configuration example of a rearrangement circuit in the second embodiment.

As illustrated in FIG. 14, the rearrangement circuit 81 includes a rearranging unit 90 and a rearranging unit 93. The rearranging unit 90 includes two selection circuits 91, 92. The rearranging unit 93 includes two FF circuits 94, 95 and a selection circuit 99.

The two input terminals, the input terminal P1 and the input terminal P2, are connected to both of the selection circuit 91 and the selection circuit 92. Thus, the two pixel data SB, the pixel data SB of the line data L1 and the pixel data SB of the line data L2, for example, are simultaneously provided to the selection circuits 91, 92. The selection circuits 91, 92 each alternately select the pixel data SB of the line data L1 and the pixel data SB of the line data L2 based on the synchronization signal (not illustrated), for example, and output the selected pixel data SB as the pixel data SC1 or SC2. The selection circuit 91 and the selection circuit 92 select the pixel data SB of different line data. The rearranging illustrated by the arrow in FIG. 15A is carried out in the line data L1, L2 by the selection circuits 91, 92.

The pixel data SC2 is provided to the FF circuit 92A. The FF circuit 92A, for example, delays the pixel data SC2 for one clock of the synchronization signal (not illustrated), and outputs the delayed signal as the pixel data SB2.

The pixel data SC1 is provided to the FF circuit 94 and the selection circuit 99 in the rearranging unit 93. The FF circuit 94, for example, delays the pixel data SC1 for one clock of the synchronization signal (not illustrated), and outputs the delayed output signal to the FF circuit 95 and the selection circuit 99. The FF circuit 95, for example, delays the output signal of the FF circuit 94 for one clock of the synchronization signal (not illustrated), and outputs the delayed output signal to the selection circuit 99.

The current pixel data SC1, the output signal of the FF circuit 94 (pixel data SC1 provided one clock before), and the output signal of the FF circuit 95 (pixel data SC1 provided two clocks before) are provided to the selection circuit 99. The selection circuit 99 selects one of the three provided pixel data SC1, and outputs the selected pixel data as the pixel data SB1.

The rearranging illustrated by the arrow in FIG. 15B is carried out in the line data L1A by the rearranging unit 93 (FF circuits 94, 95 and selection circuit 99) described above. The plural pieces of pixel data SB1, SB2 is output in parallel from the rearrangement circuit 81.

As illustrated in FIG. 13, the pixel data SB1 is provided to the LUT section 82A to undergo the LUT correction (sensor linearity correction) performed by the LUT section 82A and the cache memory 83A. As described above, the pixel data SB1 includes the R pixel and the B pixel. Thus, the LUT section 82A includes a memory 85 storing the correction curve for the R pixel (see FIG. 21) and a memory 86 storing the correction curve for the B pixel. This differs from the LUT sections 42A to 42D illustrated in FIG. 4. The LUT section 82A also includes a selection circuit 88 that selects one of the output value of the memory 85 and the output value of the memory 86 to output the selected output value to the cache memory 83A. In other words, the LUT section 82A differs from the LUT section 42A in that the memory 62 of the LUT section 42A illustrated in FIGS. 4 and 7 is replaced with the memories 85, 86 and the selection circuit 88. Like the memory 62, the plurality of (eight herein) output values are output from the memories 85, 86.

The pixel data SB2 is provided to the LUT section 82B to undergo the sensor linearity correction performed by the LUT section 82B and the cache memory 83B. The pixel data SB2 includes only the G pixels. Thus, the correction curve for the G pixel (see FIG. 21) is stored in a memory 87 in the LUT section 82B.

The pixel data SD1 obtained by performing the sensor linearity correction on the pixel data SB1 is output from the cache memory 83A. The pixel data SD2 obtained by performing the sensor linearity correction on the pixel data SB2 is output from the cache memory 83B.

The two pixel data SD1, SD2 from the cache memories 83A, 83B are provided in parallel to the rearrangement circuit 84. The rearrangement circuit 84 rearranges the pixel data SD1, SD2 to return the rearranging order (arrangement) of the pixel data rearranged by the rearrangement circuit 81 to the original order.

Figure 16:
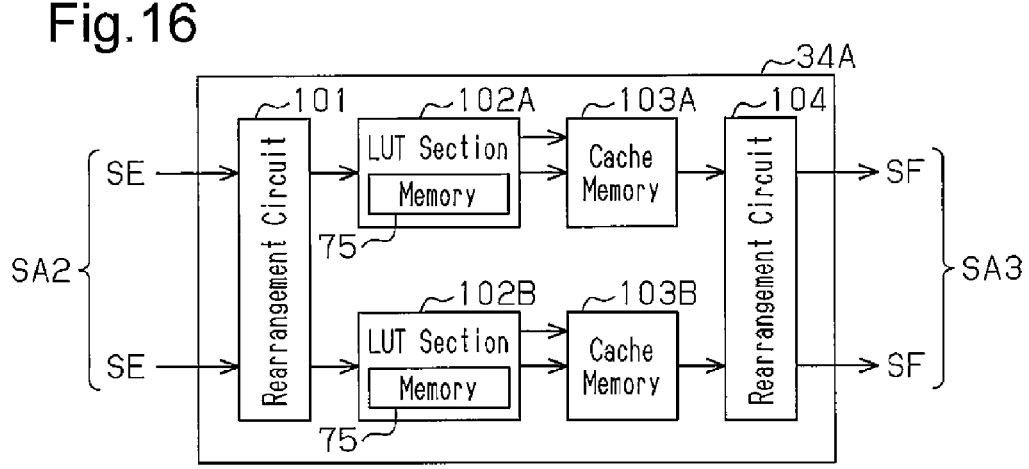
FIG. 16 is a block diagram illustrating an internal configuration example of a compression/decompression processing unit in the second embodiment.

An internal configuration example and an operation of a compression/decompression processing unit 34A will now be described with reference to FIG. 16.

The compression/decompression processing unit 34A includes a rearrangement circuit 101, a plurality of (four herein) LUT sections 102A, 102B, cache memories 103A, 103B arranged in correspondence with each LUT section 102A, 102B, and a rearrangement circuit 104. The compression/decompression processing unit 34A is a circuit that is substantially the same as to the sensor linearity correction unit 32A illustrated in FIG. 13. In other words, the rearrangement circuit 101, the LUT sections 102A, 102B, the cache memories 103A, 103B, and the rearrangement circuit 104 are circuits similar to the rearrangement circuit 81, the LUT sections 82A, 82B, the cache memories 83A, 83B, and the rearrangement circuit 84 illustrated in FIG. 13. Thus, each circuit in the compression/decompression processing unit 34A will not be described in detail.

The pixel data SE for two lines of the image data SA2 that have undergone the noise removing process are provided in parallel to the rearrangement circuit 101. The rearrangement circuit 101 rearranges the pixel data SE so that only the pixel data SE (G pixel herein) of one color component is provided to the LUT section 102B of the LUT sections 102A, 102B in the subsequent stage. The rearrangement circuit 101 rearranges the pixel data SE so that the three successive B pixels and the three successive R pixels are alternately provided to the LUT section 102A.

The pixel data that has undergone the rearranging is compressed or decompressed (LUT correction) by the LUT sections 102A, 102B and the cache memories 103A, 103B, and provided to the rearrangement circuit 104. The LUT sections 102A, 102B are circuits substantially similar to the LUT sections 72A, 72B illustrated in FIG. 10, and respectively includes the memory 75 storing the Knee correction curve and the Deknee correction curve (see FIG. 11).

The rearrangement circuit 104 rearranges the pixel data that has undergone the LUT correction performed by the LUT sections 102A, 102B and the cache memories 103A, 103B to return the rearranged order (arrangement) of the pixel data that has been rearranged by the rearrangement circuit 101 to the original order. The rearrangement circuit 104 then outputs the image data S3 including the pixel data after the rearranging, that is, the pixel data SF after the compression/decompression process to the bus I/F 35 illustrated in FIG. 2.

The second embodiment has the advantages described below.

(1) In the rearrangement circuit 81 of the sensor linearity correction unit 32A, the pixel data SB are rearranged so that only the pixel data (G pixel herein) of one color component is provided to at least one LUT section (LUT section 82B) of the LUT sections 82A, 82B in the subsequent stage. Thus, the correction curve for the plurality of color components does not need to be prepared in the LUT section 82B. Therefore, the number of memories arranged in the LUT section 82B is one.

Figure 17:
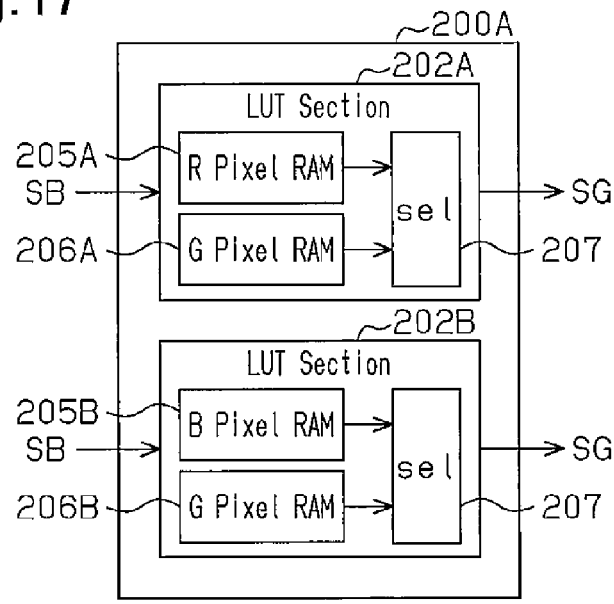
FIG. 17 is a block diagram illustrating an internal configuration example of a conventional LUT correction unit.

As illustrated in FIG. 17, in the conventional LUT correction unit 200A that does not include the rearrangement circuit 81, each LUT section 202A, 202B includes the RAM storing the correction curve for two color components for each color component, that is, two RAMs 205A, 205B and RAMs 206A, 206B. Therefore, the sensor linearity correction unit 32A of the second embodiment has a smaller memory capacity than the conventional LUT correction unit 200.

(2) The hit rate to the cache memories 83A, 83B, 103A, 103B is increased by the combination of the rearrangement circuits 81, 101 and the cache memories 83A, 83B, 103A, 103B. The effect obtained by combining the rearrangement circuit 81 and the cache memory 83A will now be described in detail.

In the rearrangement circuit 81, the pixel data SB are rearranged so that three successive B pixels and three successive R pixels are alternately provided to the LUT section 82A. The pixel data that has undergone the rearranging undergoes the LUT correction performed by the LUT section 82A and the cache memory 83A. Thus, for example, if a subject captured by the imaging device 11 includes something having a continuously extending color such as a "blue sky", three pixel data having close pixel values are successively provided to the LUT section 82A. Therefore, the hit rate to the cache memory 83A is increased compared to when one R pixel and one G pixel are alternately provided to the LUT section 82A.

(3) In the LUT sections 82A, 82B, 102A, 102B, if the current address value and the previous address value match, the reading of the output value from the memories 85 to 87, 75 is stopped. Thus, when a cache hit occurs, the memories 85 to 87, 75 are not accessed. This reduces accessing of the memories 85 to 87, 75, and the power consumption is reduced in the sensor linearity correction unit 32A and the compression/decompression processing unit 34A.

(4) In the rearrangement circuit 81, 101, the G pixel in the first line and the B pixel in the second line are interchanged, and furthermore, the arrangement of the B pixel and the R pixel in the first line that has undergone the rearranging is interchanged in a suitable manner. According to such method, the pixel data SB are rearranged in real time (promptly) in the rearrangement circuit 81, 101. For example, in the present example, only a delay of one clock of the synchronization signal occurs from the rearranging of the pixel data SB to the output of the pixel data after the rearranging.

(5) The pixel data for two lines may be divided to three line data, namely, line data in which only the R pixels are arranged, line data in which only the B pixels are arranged, and line data in which only the G pixels are arranged. In this case, however, all the pixel data in the first line after the rearranging are first stored in a buffer and then rearranged to the line data in which only the R pixels are arranged and the line data in which only the B pixels are arranged. In this method, additional memory capacity for one line becomes necessary. Furthermore, two cache memories, namely, a cache memory for the R pixel and a cache memory for the B pixel, are required with for the pixel data in the first line. This increases the circuit area and the power consumption. Moreover, the real time characteristic is adversely affected since all of the pixel data in the first line are first stored in the buffer.

In the rearrangement circuits 81 and 101, the pixel data are rearranged in real time by a simple circuit having a small circuit area, as illustrated in FIG. 14. Furthermore, the LUT correction performed on the pixel data in the first line is realized by one LUT section 82A (LUT section 102A) and one cache memory 83A (cache memory 103A). This limits increases in the circuit area and the power consumption of the sensor linearity correction unit 32A and the compression/decompression processing unit 34A.

OTHER EMBODIMENTS

It should be apparent to those skilled in the art that the present disclosure may be embodied in many other specific forms without departing from the spirit or scope of the disclosure. Particularly, it should be understood that the present disclosure may be embodied in the following forms.

Figure 19A:
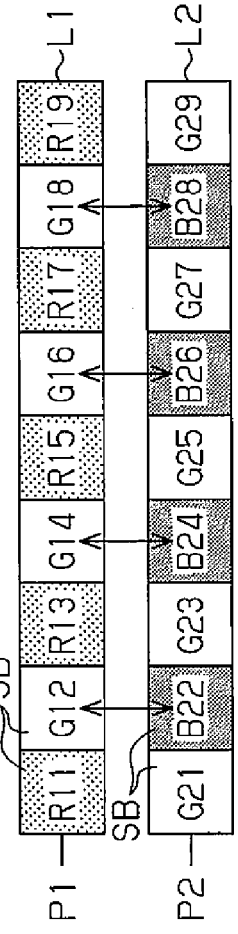
FIGS. 19A to 19C are explanatory diagrams illustrating the operation of the rearrangement circuit in the modified example.
Figure 19B:
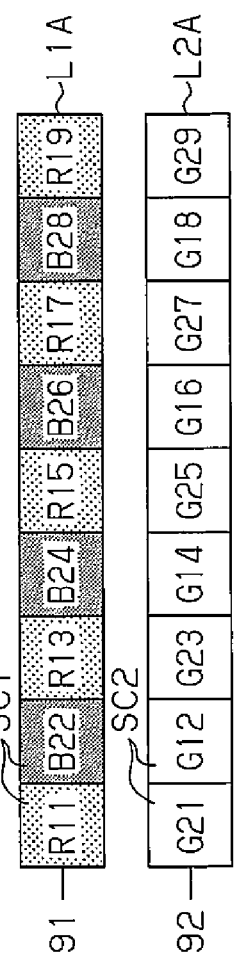

In the rearrangement circuit 81, 101 of the second embodiment, the pixel data are rearranged so that three successive B pixels and three successive R pixels are alternately provided to the LUT sections 82A, 102A. Instead for example, in the rearrangement circuit 81, 101, the pixel data may be rearranged so that four or more successive B pixels and four or more successive R pixels are alternately provided to the LUT sections 82A, 102A. Referring to FIG. 19, a circuit for rearranging the pixel data SC1 (see FIGS. 19A and 19B) that has undergone the rearranging performed by the rearranging unit 90 so that four successive B pixels and four successive R pixels are alternately arranged (arrayed) will be described.

Figure 18:
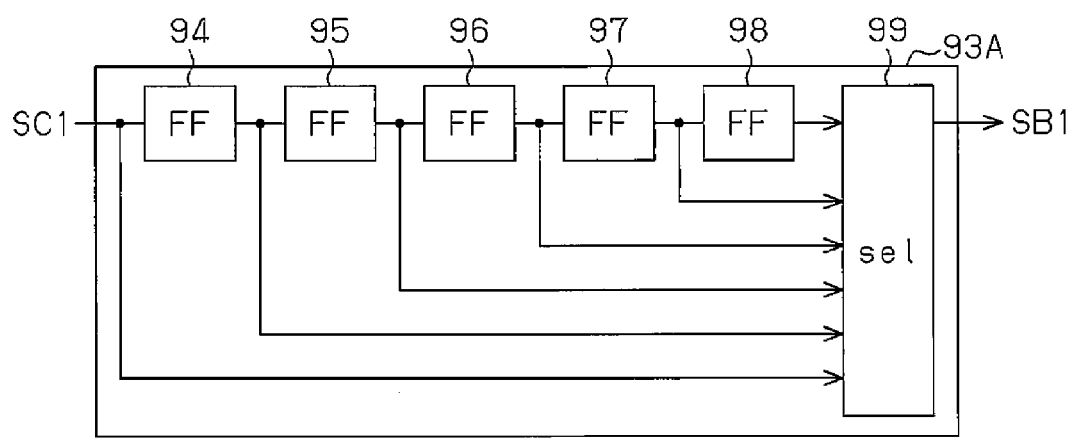
FIG. 18 is a block diagram illustrating an internal configuration example of a rearrangement circuit in a modified example.

FIG. 18 illustrates an internal configuration example of a rearranging unit 93A arranged in place of the rearranging unit 93 in the rearrangement circuit 81 illustrated in FIG. 14.

The rearranging unit 93A includes five FF circuits 94 to 98, and a selection circuit 99. The pixel data SC1 output from the rearranging unit 90 illustrated in FIG. 14 is provided to the FF circuit 94 and the selection circuit 99. The FF circuit 94, for example, delays the pixel data SC1 by one clock of the synchronization signal (not illustrated), and outputs the delayed output signal to the FF circuit 95 and the selection circuit 99. The FF circuit 95, for example, delays the output signal of the FF circuit 94 by one clock of the synchronization signal (not illustrated), and outputs the delayed output signal to the FF circuit 96 and the selection circuit 99. The FF circuit 96, for example, delays the output signal of the FF circuit 95 by one clock of the synchronization signal (not illustrated), and outputs the delayed output signal to the FF circuit 97 and the selection circuit 99. The FF circuit 97, for example, delays the output signal of the FF circuit 96 by one clock of the synchronization signal (not illustrated), and outputs the delayed output signal to the FF circuit 98 and the selection circuit 99. The FF circuit 98, for example, delays the output signal of the FF circuit 97 by one clock of the synchronization signal (not illustrated), and outputs the delayed output signal to the selection circuit 99.

Figure 19C:
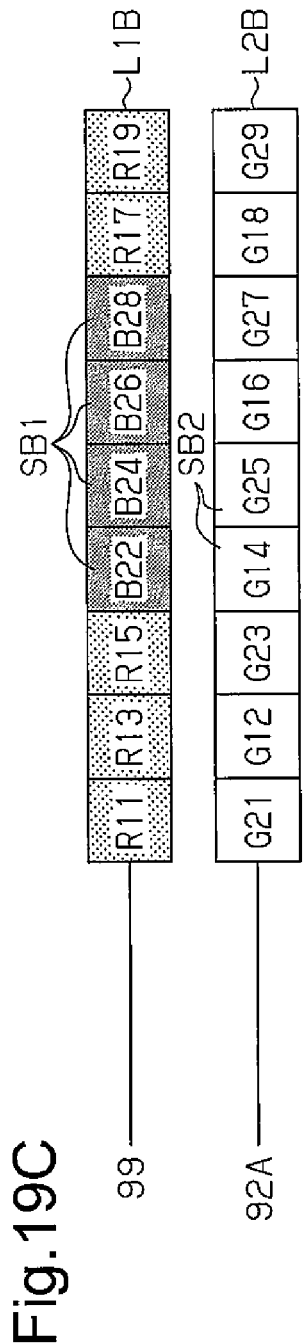
Figure 20:
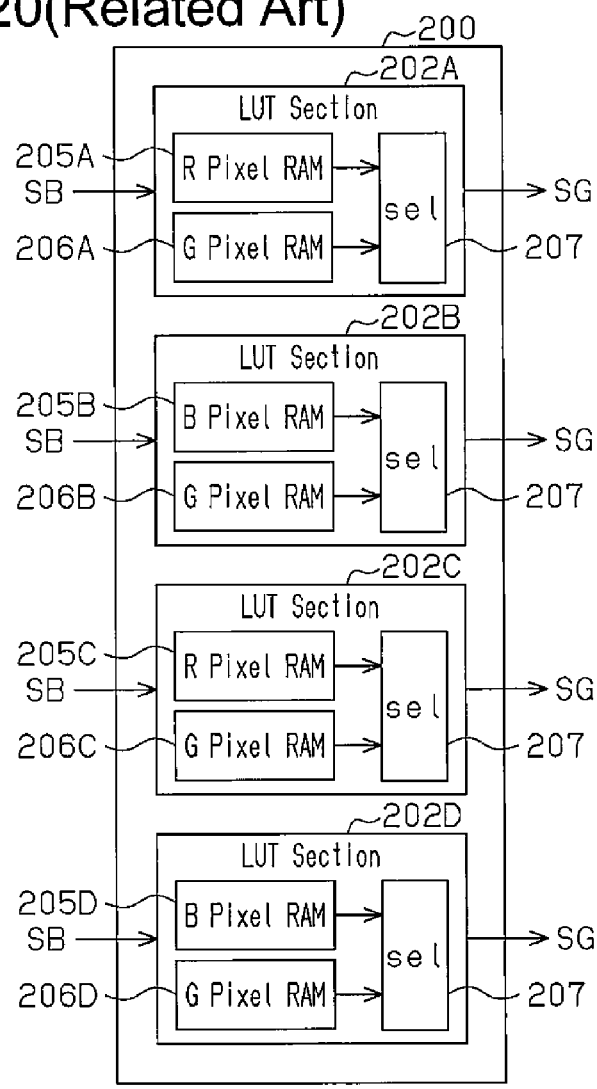
FIG. 20 is a block diagram illustrating an internal configuration example of the conventional LUT correction unit.

The current pixel data SC1 and the output signals of the FF circuits 94 to 98, namely, the pixel data SC provided one clock before, two clocks before, three clocks before, four clocks before, and five clocks before are provided to the selection circuit 99. The selection circuit 99 selects one of the six pixel data SC1 that are provided and outputs the selected pixel data as the pixel data SB1. In this case, in the selection circuit 99, the pixel data is selected so that four successive B pixels and four successive R pixels are alternately arranged in the line data L1B, as illustrated in FIGS. 19B and 19C. The rearranging illustrated in FIGS. 19A and 19B is realized by the rearranging unit 90 illustrated in FIG. 14.

The advantages similar to the second embodiment may be obtained even if changed to such configuration.

The rearranging unit 55 of the rearrangement circuit 41 in the first embodiment may be omitted. In this case, the line data L1A to L4A illustrated in FIG. 6B are provided in parallel to the LUT sections 42A to 42D. Since only the G pixels are arranged in the line data L1A, L4A, only the G pixels are provided to the LUT sections 42A, 42D. Thus, the number of memories 62 arranged in the LUT sections 42A, 42D is one. Furthermore, the hit rate to the cache memories 43A, 43D may be enhanced by the combination of the rearranging unit 50 and the cache memories 43A, 43D.

The rearranging units 93A, 93B of the rearrangement circuit 81 according to the second embodiment may be omitted. In this case, the line data L1A, L2A illustrated in FIG. 15B are provided in parallel to the LUT sections 82A, 82B.

In the rearranging unit 55 of the first embodiment, the B pixel of the line data L2A and the R pixel of the line data L3A are interchanged. Instead, for example, the R pixel of the line data L2A and the B pixel of the line data L3A may be interchanged in the rearranging unit 55.

In the rearranging unit 50 of the first embodiment described above, the R pixel of the line data L1 and the G pixel of the line data L2 are interchanged, and the G pixel of the line data L3 and the B pixel of the line data L4 are interchanged. Instead, for example, the G pixel of the line data L1 and the B pixel of the line data L2 may be interchanged, and the R pixel of the line data L3 and the G pixel of the line data L4 may be interchanged in the rearranging unit 50. In this case, the line data L1, L4 after the rearranging by the rearranging unit 50 are provided to the rearranging unit 55.

In the rearranging unit 90 of the second embodiment described above, the G pixel of the line data L1 and the B pixel of the line data L2 are interchanged. Instead, for example, the R pixel of the line data L1 and the G pixel of the line data L2 may be interchanged in the rearranging unit 90. In this case, the line data L2 after the rearranging is provided to the rearranging unit 93.

In the rearrangement circuits 81, 101 of the second embodiment, the pixel data SB for two lines may be rearranged to three line data of the line data in which only the R pixels are arranged, the line data in which only the B pixels are arranged, and the line data in which only the G pixels are arranged.

In each embodiment described above, the high-order bits used as the address value of the memory storing the correction curve are nine bits, and the low-order bit to be provided to the cache memory is three bits, but the number of bits of the high-order bit and the low-order bit is not particularly limited. For example, the high-order bit may be eight bits and the low-order bit may be four bits. In this case, for example, 16 output values are output from the memory 62 to the cache memory 43A, and 16 output values are respectively held in the 16 FF circuits in the cache memory 43A.

The number of bits of the pixel data SB in each embodiment described above is not particularly limited.

The number of lines to be provided in parallel to the rearrangement circuits 41, 71 of the first embodiment is not particularly limited.

In each embodiment described above, the LUT correction unit has been embodied as the sensor linearity correction unit 32, 32A and the compression/decompression processing unit 34, 34A. Instead, for example, the present disclosure may be applied to a correction process and an image process other than the sensor linearity correction and the compression/decompression process.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions, nor does the organization of such examples in the specification relate to a illustrating of the superiority and inferiority of the disclosure. Although embodiments of the present disclosure have been described in detail, it should be understood that various changes, substitutions, and alterations could be made hereto without departing from the spirit and scope of the disclosure.

The invention claimed is:

1. An image processing device comprising:
a first rearrangement circuit that receives, in parallel, plural pieces of line data included in image data, wherein the first rearrangement circuit rearranges plural pieces of A-bit pixel data (where A is an integer that is greater than or equal to two) included in the plural pieces of line data to arrange pixel data for only one color component in at least one of the plural pieces of line data;
LUT correction circuits respectively arranged in correspondence with the plural pieces of line data, wherein each of the LUT correction circuits includes a memory that stores a lookup table, and each of the LUT correction circuits corrects the rearranged plural pieces of A-bit pixel data using the corresponding lookup table; and
a second rearrangement circuit that rearranges the corrected plural pieces of A-bit pixel data to return the plural pieces of A-bit pixel data rearranged by the first rearrangement circuit to an original arrangement order;
wherein each of the LUT correction circuits includes
an LUT section that receives the corresponding one of the plural pieces of line data rearranged by the first rearrangement circuit and outputs output values from the memory using data of B upper order bits (where B is an integer that is smaller than A) of the A-bit pixel data in the received line data as an address value, and
a cache memory including flip-flop circuits, each holding one of the output values; and
the cache memory outputs the output value held in one of the flip-flop circuits based on data of (A-B) lower order bits of the A-bit pixel data that have been rearranged by the first rearrangement circuit.

2. The image processing device according to claim 1, further comprising a control unit that stops the output of the output values from the memory when the data of the B upper order bits is the same in two A-bit pixel data successively provided to the LUT section.

3. The image processing device according to claim 1, wherein
the memory stores the output values in a quantity that is selectable based on the A-bit pixel data;
the memory includes addresses in a quantity that is selectable based on the data of B upper order bits; and
each address of the memory stores the output values in a quantity that is selectable based on the data of the (A-B) lower order bits.

4. The image processing device according to claim 1, wherein
an odd-ordered one of the line data in the image data includes A-bit pixel data for a first color component and A-bit pixel data for a second color component that are alternately arranged;
an even-ordered one of the line data in the image data includes A-bit pixel data for the second color component and A-bit pixel data for a third color component that are alternately arranged;
the first rearrangement circuit receives, in parallel, the odd-ordered first line data and the even-ordered second line data;
the first rearrangement circuit includes a first rearranging unit including a first selection circuit and a second selection circuit that receive both of the A-bit pixel data included in the first line data and the A-bit pixel data included in the second line data; and
the first selection circuit and the second selection circuit select different A-bit pixel data and alternately select and output the A-bit pixel data included in the first line data and the A-bit pixel data included in the second line data.

5. The image processing device according to claim 4, wherein
the first rearrangement circuit receives, in parallel, the first line data, the second line data, odd-ordered third line data, and even-ordered fourth line data;
the first rearranging unit includes a third selection circuit and a fourth selection circuit that receive both of the A-bit pixel data included in the third line data and the A-bit pixel data included in the fourth line data, select different A-bit pixel data, and alternately select and output the A-bit pixel data included in the third line data and the A-bit pixel data included in the fourth line data;
the first selection circuit and the fourth selection circuit output line data in which only the plural pieces of A-bit pixel data for the second color component are arranged;
the second selection circuit outputs fifth line data in which the A-bit pixel data for the first color component and the A-bit pixel data for the third color component are alternately arranged; and
the third selection circuit outputs sixth line data in which the A-bit pixel data for the first color component and the A-bit pixel data for the third color component are alternately arranged.

6. The image processing device according to claim 5, wherein
the first rearrangement circuit includes a second rearranging unit that receives the fifth line data and the sixth line data in parallel, and
the first rearrangement circuit interchanges the A-bit pixel data for the third color component in an Nth column (where N is an even number or an odd number) of the fifth line data and the A-bit pixel data for the first color component in an (N−1)th column of the sixth line data.

7. The image processing device according to claim 4, wherein
the first rearrangement circuit includes a second rearranging unit that receives seventh line data from the first selection circuit, wherein A-bit pixel data for the first color component and A-bit pixel data for the third color component are alternately arranged in the seventh line data; and
the second rearranging unit rearranges the plural pieces of A-bit pixel data included in the seventh line data so that plural pieces of A-bit pixel data for the first color component are successively arranged and plural pieces of A-bit pixel data for the third color component are successively arranged.

8. The image processing device according to claim 1, wherein each of the LUT correction circuits includes a correction circuit that executes sensor linearity correction or a compression/decompression process on the plural pieces of A-bit pixel data that have been rearranged by the first rearrangement circuit.

9. A method for processing an image, the method comprising:
inputting, in parallel, plural pieces of line data included in image data;
rearranging plural pieces of A-bit pixel data (where A is an integer greater than or equal to two) included in the plural pieces of line data so that only the pixel data for one color component is arranged in at least one of the plural pieces of line data;

reading output values from a memory that stores a lookup table using data of B upper order bits (where B is an integer smaller than A) of the A-bit pixel data that has been rearranged as an address value;

holding each of the read output values; and outputting one of the held output values as corrected pixel data based on data of (A−B) lower order bits of the A-bit pixel data that has been rearranged.

\* \* \* \* \*